(12) United States Patent
Kobayashi

(10) Patent No.: US 9,571,954 B2
(45) Date of Patent: Feb. 14, 2017

(54) INFORMATION PROCESSING SYSTEM, INFORMATION PROCESSING METHOD, MOBILE PHONE, SERVER, AND CONTROL METHODS AND CONTROL PROGRAMS THEREOF

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/387,712

(22) PCT Filed: Mar. 18, 2013

(86) PCT No.: PCT/JP2013/057637
§ 371 (c)(1),
(2) Date: Sep. 24, 2014

(87) PCT Pub. No.: WO2013/146413
PCT Pub. Date: Oct. 3, 2013

(65) Prior Publication Data
US 2015/0056978 A1     Feb. 26, 2015

(30) Foreign Application Priority Data

Mar. 24, 2012  (JP) ................................. 2012-068515

(51) Int. Cl.
*H04M 3/00* (2006.01)
*H04W 4/00* (2009.01)
(Continued)

(52) U.S. Cl.
CPC ............ *H04W 4/005* (2013.01); *G06F 13/385* (2013.01); *H04M 1/72533* (2013.01); *H04M 11/00* (2013.01); *H04W 4/003* (2013.01)

(58) Field of Classification Search
CPC .... H04M 1/72533; H04M 3/00; H04W 8/245; H04W 88/02
(Continued)

(56) References Cited

U.S. PATENT DOCUMENTS 5,423,002 A    6/1995  Hart
5,583,997 A   12/1996  Hart
(Continued)

FOREIGN PATENT DOCUMENTS

CN    1362828 A    8/2002
CN    1375792 A   10/2002
(Continued)

OTHER PUBLICATIONS

International Search Report mailed Apr. 16, 2013 in corresponding PCT International Application.
(Continued)

*Primary Examiner* — Huy C Ho
(74) *Attorney, Agent, or Firm* — Finnegan, Henderson, Farabow, Garrett & Dunner, L.L.P.

(57) ABSTRACT

When an input device is connected via a communication interface, a mobile phone determines whether a local device can control the input device. When it is determined that the local device cannot control the input device, the mobile phone requests a server connected via a wireless communication network to control the input device. The mobile phone controls signal transfer between the input device and the server via the communication interface and the wireless communication network so that the server can control the input device by establishing communication between the input device and the server. In response to the request from the mobile phone, the server controls the input device via the established communication with the input device.

20 Claims, 20 Drawing Sheets

(51) Int. Cl.
*H04M 1/725* (2006.01)
*H04M 11/00* (2006.01)
*G06F 13/38* (2006.01)

(58) Field of Classification Search
USPC .................................................. 455/420
See application file for complete search history.

(56) References Cited

U.S. PATENT DOCUMENTS

| | | | |
|---|---|---|---|
| 9,022,279 B2* | 5/2015 | Bolton | G06Q 10/087 235/375 |
| 2003/0137689 A1 | 7/2003 | Bontempi | |
| 2003/0220988 A1 | 11/2003 | Hymel | |
| 2006/0105816 A1 | 5/2006 | Hwang et al. | |
| 2008/0059398 A1 | 3/2008 | Tsutsui | |
| 2008/0062977 A1 | 3/2008 | Kaneko et al. | |
| 2008/0309961 A1 | 12/2008 | Aichi et al. | |
| 2009/0061841 A1* | 3/2009 | Chaudhri | H04M 1/72527 455/420 |
| 2011/0222104 A1 | 9/2011 | Mohammad et al. | |
| 2015/0087356 A1 | 3/2015 | Kobayashi | |

FOREIGN PATENT DOCUMENTS

| | | |
|---|---|---|
| CN | 1961299 A | 5/2007 |
| CN | 201114316 Y | 9/2008 |
| GB | 2 365 599 A | 2/2002 |
| JP | 6-21944 | 1/1994 |
| JP | 2006-67368 | 3/2006 |
| JP | 2006-129468 | 5/2006 |
| JP | 2007-102308 | 4/2007 |
| JP | 2008-65546 | 3/2008 |
| JP | 2008-65774 | 3/2008 |
| JP | 2011-223506 | 11/2011 |
| KR | 10-2011-0137614 | 12/2011 |
| WO | WO 02/103462 A2 | 12/2002 |
| WO | WO 2006/022429 A1 | 3/2006 |

OTHER PUBLICATIONS

Extended European Search Report mailed Oct. 1, 2015 by the European Patent Office in counterpart European Patent Application No. 13755632.0.
J. Kuwahara et al., "A Study on Remote Plug and Play of USB Equipment that Assumes Portable Terminal", IPSJ SIG Technical Report, vol. 2005, No. 113, pp. 181-186, Nov. 2005.
International Search Report mailed May 14, 2013.
Extended European Search Report mailed Nov. 25, 2015 by the European Patent Office in counterpart European Patent Application No. 13769068.1.
Office Action issued by the Chinese Patent Office in counterpart Chinese Patent Application No. 201380016260.1, dated Nov. 2, 2015.

* cited by examiner

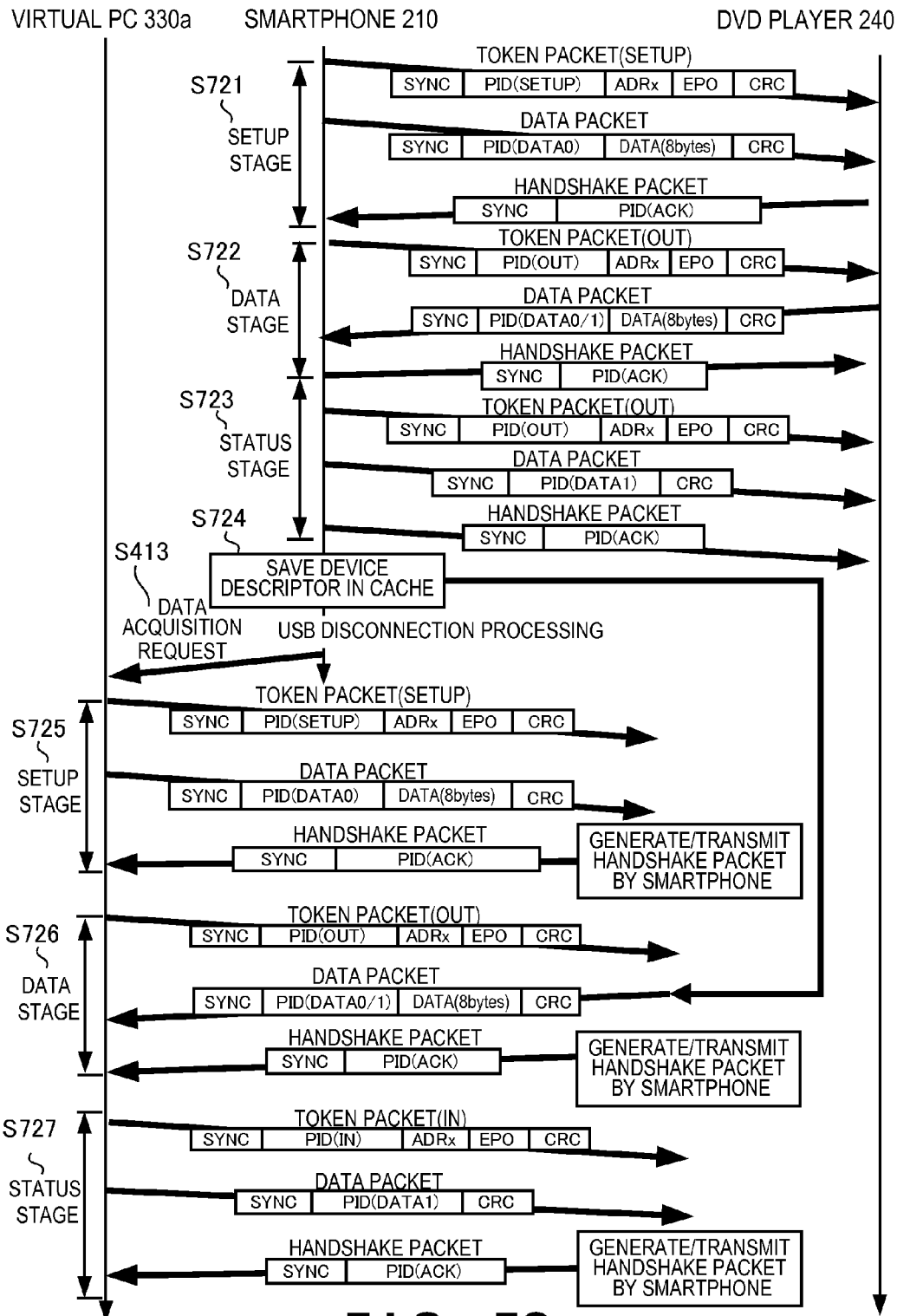
F I G. 7C

| INPUT DEVICE | INQUIRY CONTENTS |
|---|---|
| DVD PLAYER | INQUIRY ABOUT WHETHER TO REPRODUCE DATA ON SCREEN OF SMARTPHONE |
| SCANNER | INQUIRY ABOUT WHETHER TO STORE READ IMAGE IN VIRTUAL PC |
| DIGITAL CAMERA | INQUIRY ABOUT WHETHER TO UPLOAD DATA TO BLOG, STORE DATA IN PHOTO ALBUM ON INTERNET, OR REQUEST PRINTING SERVICE TO PRINT PHOTOS |
| SENSOR | DISPLAY CANDIDATES OF TRANSMISSION DESTINATION OF SENSOR RESULT, AND PROMPT USER TO SELECT TRANSMISSION DESTINATION |

740

F I G. 7E

| INPUT DEVICE | PROCESSING CANDIDATE |
|---|---|
| VIDEO INPUT DEVICE | STORING IN SERVER/MAIL SENDING/UPLOADING TO VIDEO SITE/STREAMING AND DOWNLOADING TO MOBILE TERMINAL AS RELAY APPARATUS |
| IMAGE INPUT DEVICE | STORING IN SERVER/MAIL SENDING/UPLOADING TO IMAGE SITE/UPLOADING TO BLOG/PRINT REQUEST/TRANSMITING TO MOBILE TERMINAL |
| DIGITAL CAMERA | STORING IN SERVER/MAIL SENDING/UPLOADING TO IMAGE SITE/UPLOADING TO BLOG/PRINT REQUEST/TRANSMITING TO MOBILE TERMINAL |
| AUDIO INPUT DEVICE | STORING IN SERVER/MAIL SENDING/UPLOADING TO MUSIC SITE/TRANSMITTING TO MOBILE TERMINAL |
| GEIGER COUNTER | STORING IN SERVER/UPLOADING TO RADIATION DOSE OPEN SITE/TRANSMITTING TO MOBILE TERMINAL |
| ... | |

F I G. 7F

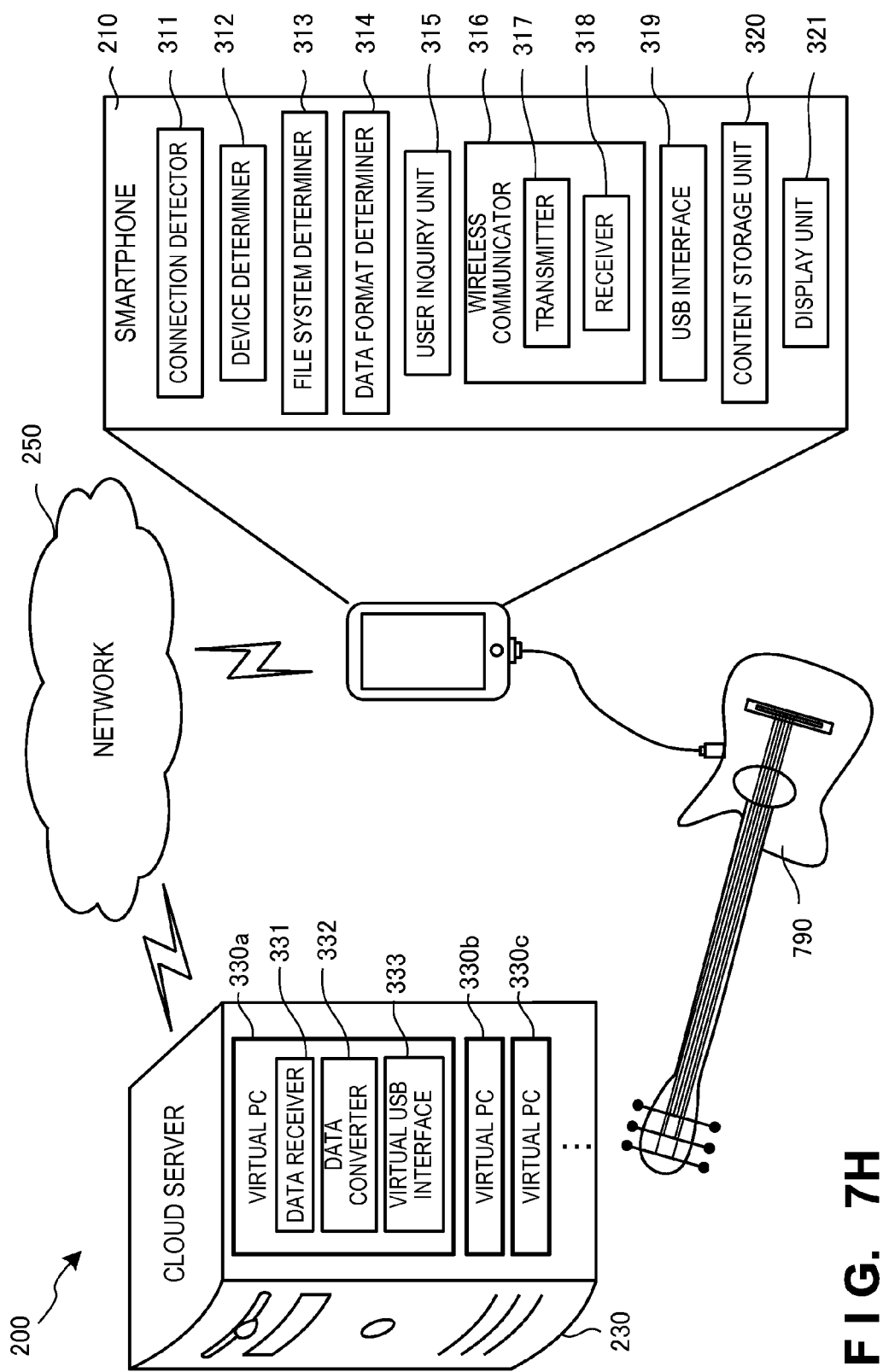
F I G. 7H

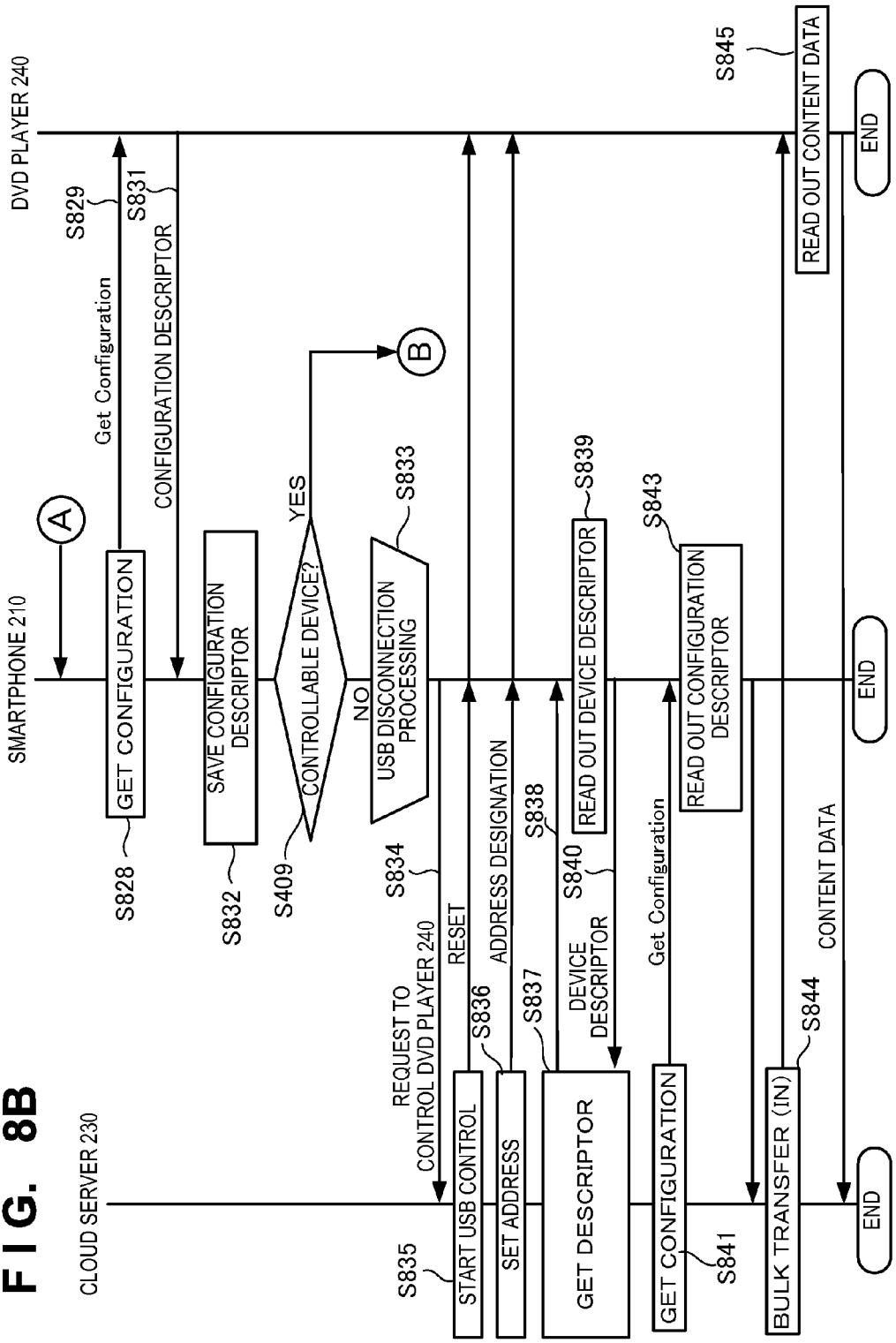

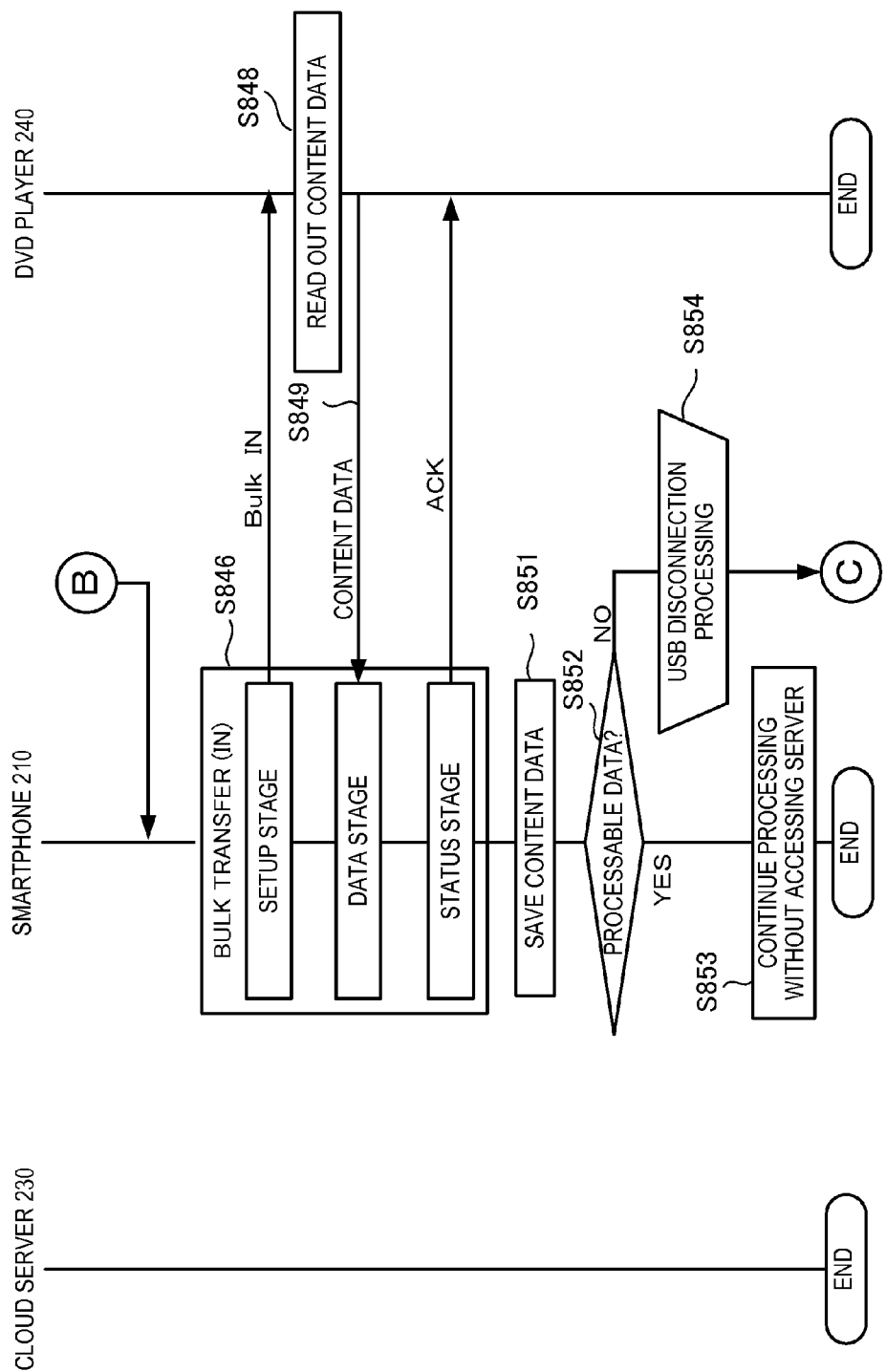

INFORMATION PROCESSING SYSTEM, INFORMATION PROCESSING METHOD, MOBILE PHONE, SERVER, AND CONTROL METHODS AND CONTROL PROGRAMS THEREOF

CROSS-REFERENCE TO RELATED PATENT APPLICATIONS

This application is a National Stage Entry of International Application No. PCT/JP2013/057637, filed Mar. 18, 2013, which claims priority from Japanese Patent Application No. 2012-068515, filed Mar. 24, 2012. The entire contents of the above-referenced applications are expressly incorporated herein by reference.

TECHNICAL FIELD

The present invention relates to an information processing system, an information processing method, a mobile phone, a server, and control methods and control programs thereof.

BACKGROUND ART

In the above-described technical field, patent literature 1 discloses a remote desktop system for integrating and connecting a plurality of peripheral devices (for example, a display, a mouse, a keyboard, a printer, and the like). Patent literature 1 also discloses a mobile communication terminal (for example, a smartphone or the like) connectable to a remote server via a wireless LAN (Local Area Network) or mobile communication network.

CITATION LIST

Patent Literature

Patent literature 1: Japanese Patent Laid-Open No. 2007-102308

SUMMARY OF INVENTION

Technical Problem

The technique described in patent literature 1, however, does not disclose a technique of connecting an input device to a mobile phone itself, and does not mention a technique in which a server controls the input device via the mobile phone. That is, it is impossible to acquire data from various input device by only connecting the mobile phone to the input devices.

The present invention enables to provide a technique of solving the above-described problem.

Solution to Problem

One aspect of the present invention provides a system comprising:
a mobile phone; and
a server,
the mobile phone comprising:
a determiner that, when an input device is connected via a communication interface, determines whether a local device can control the input device;
a requester that, when the determiner determines that the local device cannot control the input device, requests the server connected via a wireless communication network to control the input device; and
a signal transfer controller that controls signal transfer between the input device and the server via the communication interface and the wireless communication network so that the server can control the input device by establishing communication between the input device and the server, and
the server controlling the input device via the established communication with the input device in response to the request from the requester.

Another aspect of the present invention provides a method comprising:
determining, when an input device is connected via a communication interface, whether a local device can control the input device;
requesting, when it is determined in the determining that the local device cannot control the input device, a server connected via a wireless communication network to control the input device;
controlling the input device via established communication with the input device in response to the request in the requesting; and
controlling signal transfer between the input device and the server via the communication interface and the wireless communication network so that the server can control the input device by establishing communication between the input device and the server.

Still other aspect of the present invention provides a mobile phone comprising:
a determiner that, when an input device is connected via a communication interface, recognizes the input device and determines whether a local device can control the input device;
a requester that, when the determiner determines that the local device cannot control the input device, requests a server connected via a wireless communication network to control the input device; and
a signal transfer controller that controls signal transfer between the input device and the server via the communication interface and the wireless communication network so that the server can control the input device by establishing communication between the input device and the server.

Still other aspect of the present invention provides a control method of a mobile phone, comprising:
determining, when an input device is connected via a communication interface, whether a local device can control the input device by recognizing the input device;
requesting, when it is determined in the determining that the local device cannot control the input device, a server connected via a wireless communication network to control the input device; and
controlling signal transfer between the input device and the server via the communication interface and the wireless communication network so that the server can control the input device by establishing communication between the input device and the server.

Still other aspect of the present invention provides a control program for causing a computer to execute a method, comprising:
determining, when an input device is connected via a communication interface, whether a local device can control the input device by recognizing the input device;
requesting, when it is determined in the determining that the local device cannot control the input device, a server connected via a wireless communication network to control the input device; and
controlling signal transfer between the input device and the server via the communication interface and the wireless communication network so that the server can control the input device by establishing communication between the input device and the server.

Still other aspect of the present invention provides a server included in the above-described information processing system, comprising:

a controller that controls an input device via established communication with the input device in response to a request from a requester.

Still other aspect of the present invention provides a control method of a server included in the above-described system, comprising:

controlling an input device via established communication with the input device in response to a request from a requester.

Still other aspect of the present invention provides a control program of a server included in the above-described information processing system, for causing a computer to execute a method, comprising:

controlling an input device via established communication with the input device in response to a request from a requester.

Advantageous Effects of Invention

According to the present invention, it is possible to acquire data from various input devices connected to a mobile phone.

BRIEF DESCRIPTION OF DRAWINGS

FIG. 7C is a view showing still other example of packet transmission/reception processing in the information processing system according to the second embodiment of the present invention;

FIG. 7E is a table showing the structure of a table used in the information processing system according to the second embodiment of the present invention;

FIG. 7F is a table showing the structure of a table used in the information processing system according to the second embodiment of the present invention;

FIG. 7H is a block diagram showing another modification of the information processing system according to the second embodiment of the present invention;

FIG. 8B is a sequence chart showing the example of the communication establishment processing between the server and the device in the information processing system according to the second embodiment of the present invention;

FIG. 8C is a sequence chart showing the example of the communication establishment processing between the server and the device in the information processing system according to the second embodiment of the present invention;

DESCRIPTION OF EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing system 100 according to the first embodiment of the present invention will be described with reference to FIG. 1. The information processing system 100 converts, via a server, data provided by an input device connected to a mobile phone so as to be outputtable from the mobile phone.

Figure 1:
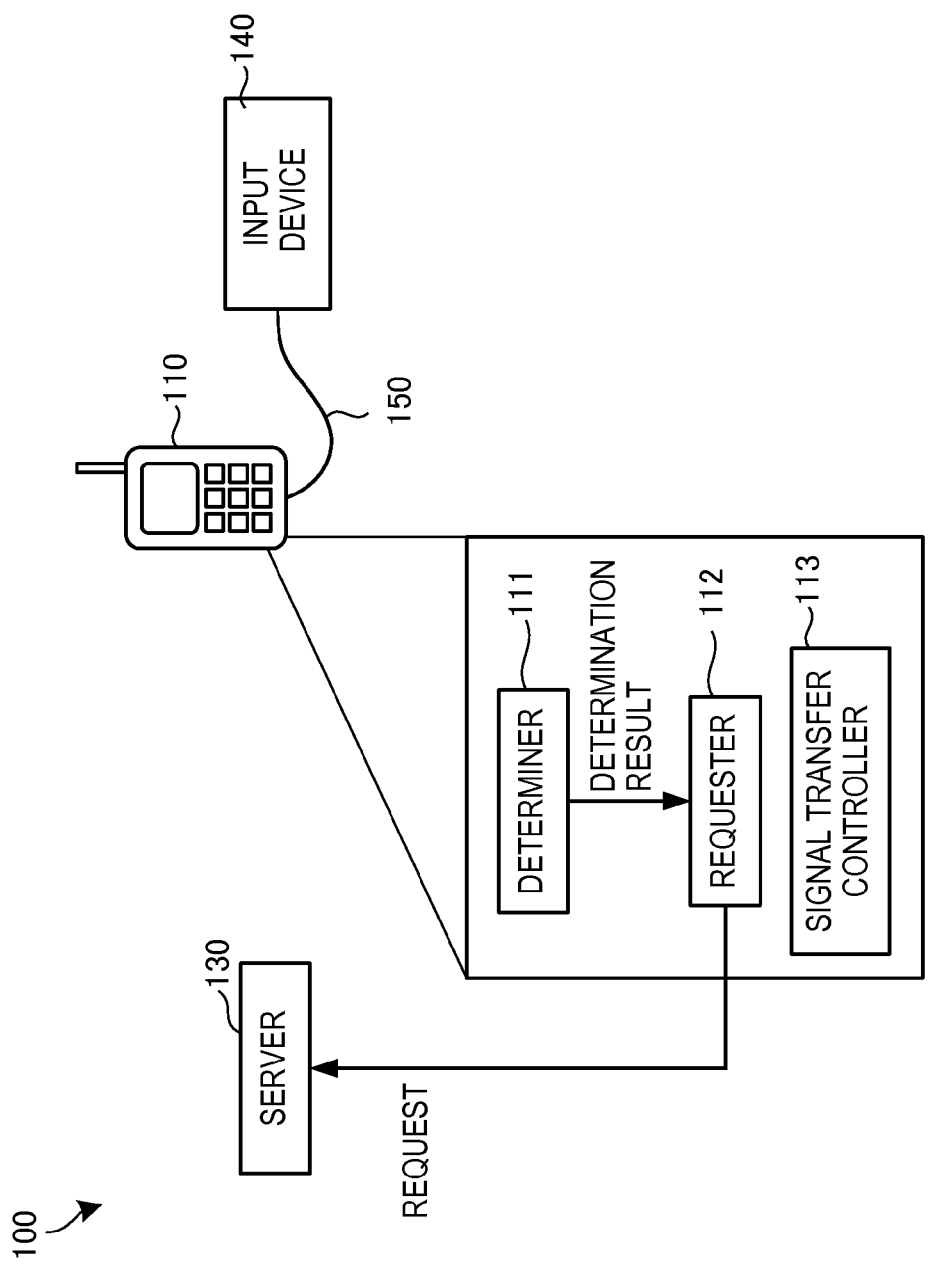
FIG. 1 is a block diagram showing the arrangement of an information processing system according to the first embodiment of the present invention.

As shown in FIG. 1, the information processing system 100 includes a mobile phone 110, a server 130, and a input device 140. The mobile phone 110 includes a determiner 111, a requester 112, and a signal transfer controller 113.

When the input device 140 is connected via a communication interface 150, the determiner 111 of the mobile phone 110 determines whether the local device 110 can control the input device 140. If the determiner 111 determines that the local device 110 cannot control the input device 140, the requester 112 requests the server 130 connected via a wireless communication network to control the input device 140. The signal transfer controller 113 controls signal transfer between the input device 140 and the server 130 via the communication interface 150 and the wireless communication network so that the server 130 can control the input device 140 by establishing communication between the input device 140 and server 130.

In response to the request from the requester 112, the server 130 controls the input device 140 via the established communication with the input device 140.

In the information processing system according to this embodiment, the above-described arrangement and operation enable the server to control the input device connected to the mobile phone, and acquire data from the input device.

Second Embodiment

Figure 2:
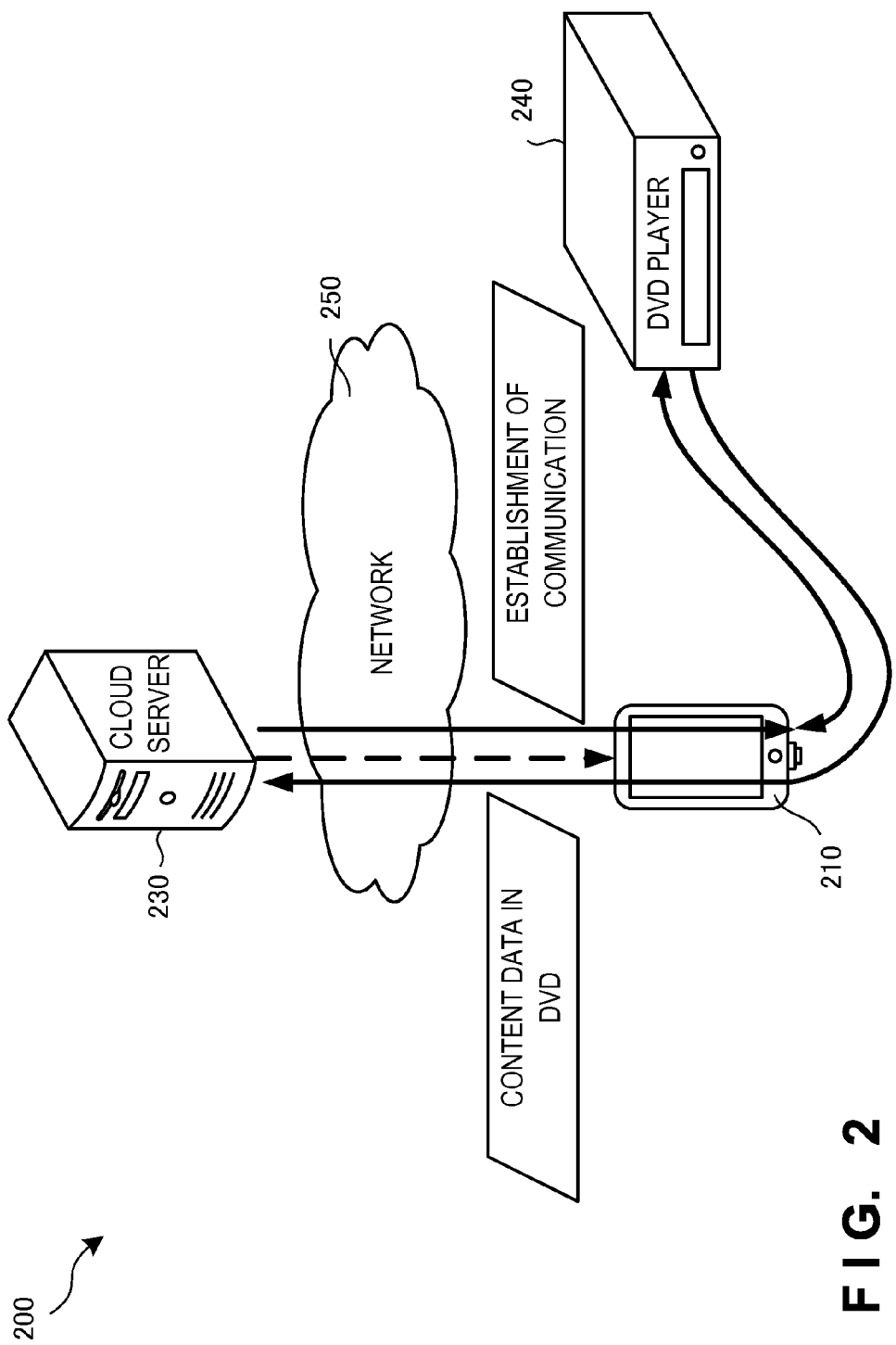
FIG. 2 is a view showing the outline of the arrangement of an information processing system according to the second embodiment of the present invention.

An information processing system 200 according to the second embodiment of the present invention will be described with reference to FIG. 2. FIG. 2 is a view for explaining the outline of the information processing system 200 according to this embodiment. In the information processing system 200, a smartphone 210 and a cloud server 230 are communicably connected via a network 250. The smartphone 210 is also connected to a DVD player 240.

The smartphone 210 is connected to the DVD player 240 via a communication interface such as USB (Universal Serial Bus). When the smartphone 210 is connected to the DVD player 240, it first determines whether it can identify the device. If the smartphone can identify the device, it determines whether the local device can acquire data in the file system of the device, and whether the acquired data has a data format processable by the local device. If it is determined that the local device cannot process the data format, the smartphone 210 is connected to the cloud server 230 via the network 250, and requests the cloud server 230 to control the DVD player 240. The smartphone 210 controls signal transfer to control communication between the cloud server 230 and the DVD player 240.

Upon receiving the request to control the DVD player 240 from the smartphone 210, the cloud server 230 controls the DVD player 240 via communication with the DVD player 240, that has been established by the smartphone 210.

(Arrangement of Information Processing System)

Figure 3:
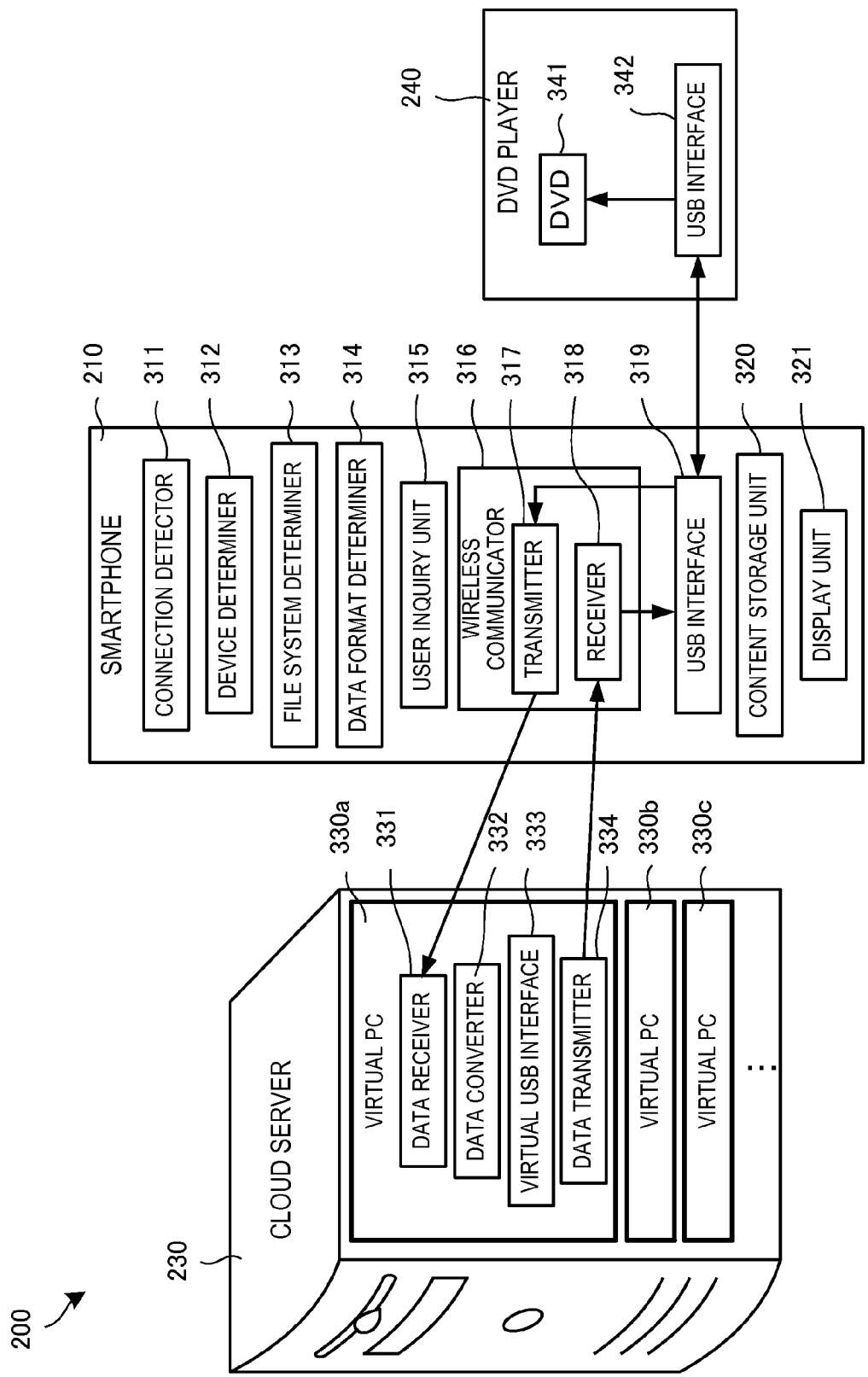
FIG. 3 is a block diagram showing the arrangement of the information processing system according to the second embodiment of the present invention.

The internal arrangement of the information processing system 200 will be described with reference to FIG. 3. FIG. 3 is a block diagram showing the arrangement of the information processing system 200 according to this embodiment.

The smartphone 210 includes a connection detector 311, a device determiner 312, a file system determiner 313, a data format determiner 314, a user inquiry unit 315, and a wireless communicator 316. The smartphone 210 also includes a USB interface 319, a content storage unit 320, and a display unit 321. The wireless communicator 316 includes a transmitter 317 and a receiver 318.

On the other hand, the cloud server 230 includes virtual PCs 330a to 330c. The virtual PC 330a includes a data receiver 331, a data converter 332, a virtual USB interface 333, and a data transmitter 334. Furthermore, a DVD (Digital Video Disc) 341 is detachable from the DVD player 240, and the DVD player 240 includes a USB interface 342.

The connection detector 311 of the smartphone 210 detects that the smartphone is connected to some device via the USB interface 319 as a communication interface. When the device determiner 312 recognizes that the device connected via the USB interface 319 is the DVD player 240, it determines whether the local device can control the DVD player 240. That is, the device determiner 312 determines whether the local device includes a driver for controlling the DVD player 240 by detecting the type of detected connected device, the manufacturer of the DVD player 240, the product type of the DVD player 240, and the like.

The file system determiner 313 confirms the file system of data stored in the DVD 341, and determines whether the smartphone 210 can access the DVD 341. For example, UDF (Universal Disk Format) is known as a DVD file system.

The data format determiner 314 determines whether an application of the local device can process the data format of data stored in the DVD player 240.

When the local device includes no driver, cannot cope with the file system of the DVD 341, or cannot process the data format, the user inquiry unit 315 inquires of the user whether to access the cloud server 230. Especially when the data format is determined as a data format that cannot be processed by the local device, the user inquiry unit 315 inquires of the user whether to request the cloud server 230 to process the data. The transmitter 317 transmits a request result selected by the user to the virtual PC 330a of the cloud server 230.

The receiver 318 decapsulates an IP (Internet Protocol) packet received from the virtual USB interface 333, and converts it into USB data. The receiver 318 transmits the data to the USB interface 342 of the DVD player 240 via the USB interface 319. On the other hand, in response to a command received from the virtual PC 330a via the smartphone 210, the DVD player 240 sends data (for example, content data) to the USB interface 319 via the USB interface 342.

The transmitter 317 receives data from the DVD 341 via the USB interface 319, encapsulates the data in data of an IP format, and transfers the data to the data receiver 331.

The content storage unit 320 stores the converted data transmitted by the virtual PC 330a. The display unit 321 is a display for displaying the converted data.

The virtual PC 330a of the cloud server 230 receives a request from the smartphone 210 at the data receiver 331. The data converter 332 converts the data acquired from the DVD player 240 into a data format processable (displayable) by the smartphone 210 based on the request from the smartphone 210. The virtual USB interface 333 establishes communication with the DVD player 240, and reads out and acquires the data stored in the DVD 341 based on the request from the smartphone 210. The data transmitter 334 transmits the converted data to the smartphone 210.

The DVD player 240 is connected to the USB interface 319 of the smartphone 210 via the USB interface 342.

(Processing Sequence of Overall Information Processing System 200)

Figure 4:
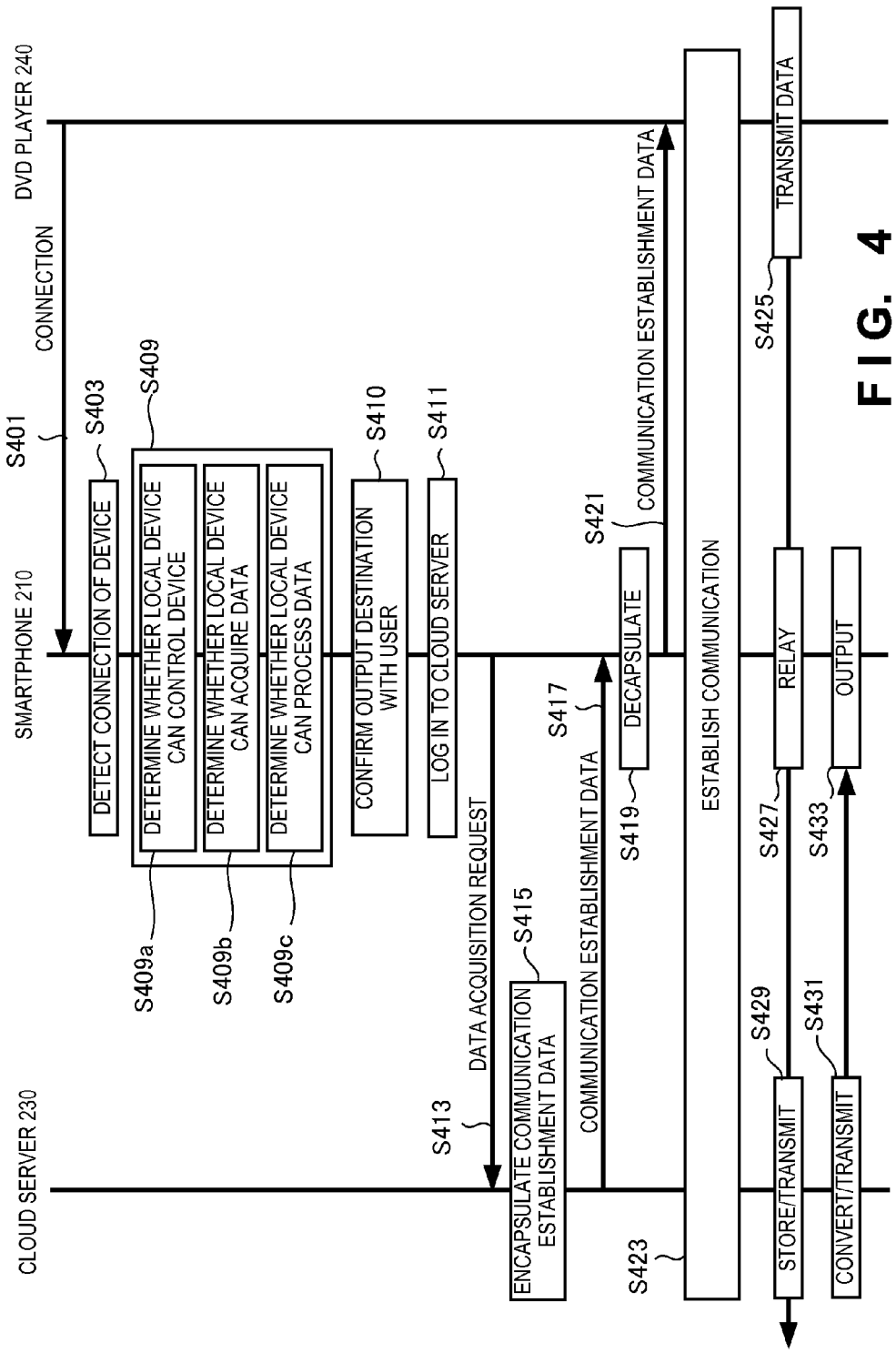
FIG. 4 is a sequence chart showing the processing sequence of the overall information processing system according to the second embodiment of the present invention.

The processing sequence of the overall information processing system 200 will be described with reference to a sequence chart shown in FIG. 4.

When an input device is connected to the smartphone 210 in step S401, the connection detector 311 of the smartphone 210 detects in step S403 that the device (in this example, the DVD player 240) has been connected via the USB interface. In step S409, the smartphone 210 determines whether the local device can control the DVD player 240 (S409a). If the smartphone 210 determines that the local device can control the DVD player 240, it confirms a file system, and determines whether the local device can acquire the data in the DVD 341 (S409b). Furthermore, the smartphone 210 determines whether the local device can display and reproduce the content data stored in the DVD player 240 (S409c).

In step S410, it is confirmed with the user where and how the data acquired from the input device is output. For example, a message "A content in DVD has been recognized. Where do you want to output the content?" is displayed on the display unit 321 of the smartphone 210. Furthermore, for example, options such as "smartphone", "external display", "mail attachment", and "uploading to video site" may be displayed.

Figure 6:
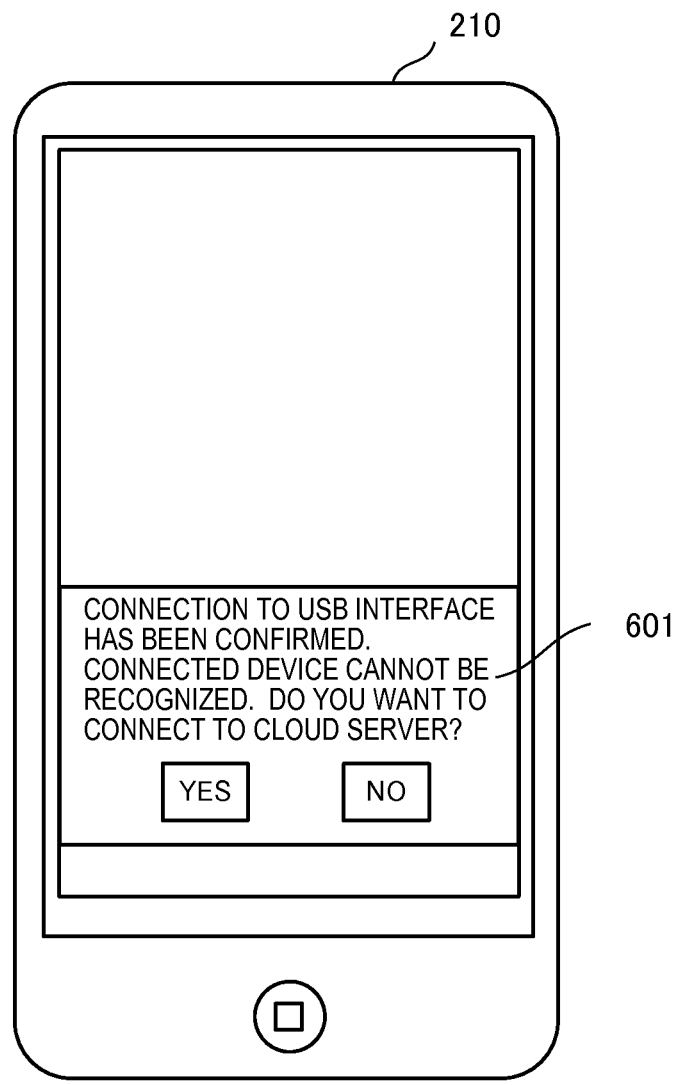
FIG. 6 is a view showing a message displayed on the smartphone according to the second embodiment of the present invention.

If "impossible" is determined in one of the determination processes in step S409, or even if "possible" is determined in step S409, when output via the cloud server is selected in step S410, the smartphone 210 logs in to the cloud server 230 in step S411. At this time, as shown in FIG. 6, confirmation is performed with the user of the smartphone 210. In step S413, the transmitter 317 requests the cloud server 230 to acquire the data from the DVD player 240.

Furthermore, in step S415, the virtual USB interface 333 of the cloud server 230 generates data for establishing communication with the DVD player 240. The data transmitter 334 encapsulates the communication establishment data, and transmits the data to the smartphone 210 (S417). In step S419, the smartphone 210 decapsulates the communication establishment data received from the cloud server 230. In step S421, the USB interface 319 transmits the decapsulated communication establishment data to the DVD player 240. In step S423, communication between the smartphone 210, the cloud server 230, and the DVD player 240 is established.

When communication with the cloud server 230 is established, in step S425 the cloud server 230 drives the DVD player 240 to read out the data stored in the DVD 341 and transmit the data to the smartphone 210. In step S427, the smartphone 210 relays the data transmitted from the DVD player 240 to transmit it to the cloud server 230.

At this time, when an amount of data acquired from the DVD player 240 serving as an input device reaches a predetermined amount, the transmitter 317 may transfer the data to the server. As for an input device whose output is very slow, for example, it is more efficient to merge data in the smartphone, and send the data to the cloud server 230 after a given data amount is reached. In step S429, the data receiver 331 of the cloud server 230 receives the data relayed by the smartphone 210. The cloud server 230 stores or transmits the received data. In step S431, the data transmitter 334 converts the received data, as needed, and transmits the data to the smartphone 210. In step S433, the smartphone 210 outputs (displays and reproduces) the received converted data.

(Processing Sequence of Smartphone)

Figure 5A:
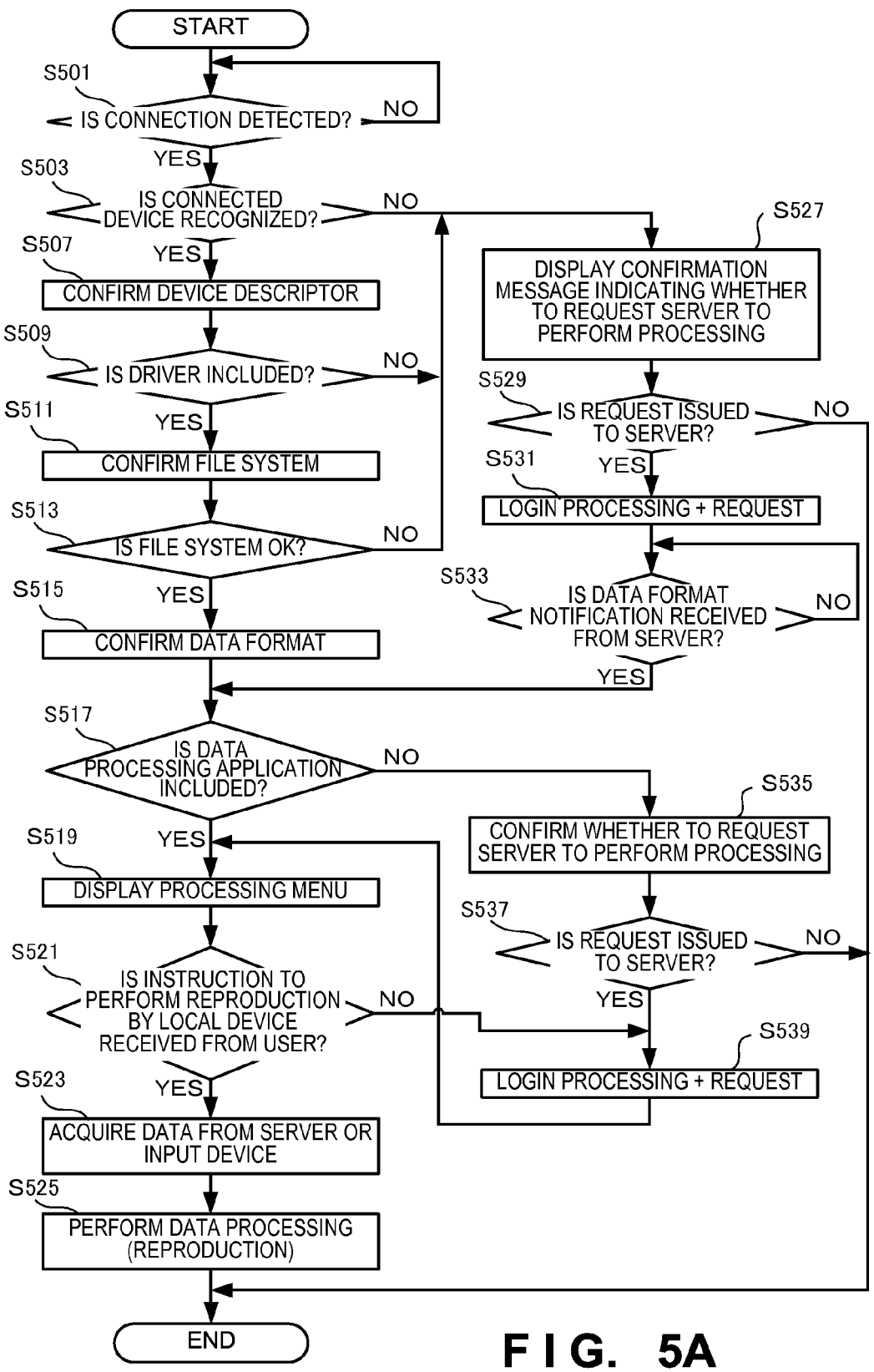
FIG. 5A is a flowchart showing the sequence of a procedure by a smartphone according to the second embodiment of the present invention.

The processing sequence of the smartphone 210 will be described in more detail with reference to FIG. 5A. When the connection detector 311 detects connection of a device in step S501, the process advances to step S503. In step S503, the device determiner 312 attempts to recognize the connected device. If the device determiner 312 cannot recognize the device, the process advances to step S527 to display a message for confirming with the user whether to request the cloud server 230 to perform processing. If the device determiner 312 can recognize the connected device, the process advances to step S507, and the USB interface 319 confirms a device descriptor. In step S509, the USB interface 319 confirms whether the local device includes a driver for controlling the connected device. If the local device includes no driver, the process advances to step S527; otherwise, the process advances to step S511, and the file system determiner 313 confirms the file system of the device. If the local device can cope with the file system, the process advances to step S513. On the other hand, if the local device cannot cope with the file system, the process advances to step S527.

In step S515, the data format determiner 314 determines the data format of the data stored in the DVD 341 of the DVD player 240. In step S517, the smartphone 210 confirms whether it includes an application capable of processing data of the data format. If the smartphone 210 includes no such application, the process advances to step S535; otherwise, the process advances to step S519, and the display unit 321 displays a processing menu. For example, options such as "display on smartphone", "display on external display", "mail attachment", "uploading to video site", and "store in database" are displayed.

When an instruction to perform data processing by the local device is accepted from the user in step S521, the process advances to step S523 to acquire the data from the DVD player 240. In step S525, the display unit 321 displays (outputs) the acquired data.

On the other hand, in step S527, the smartphone 210 displays a confirmation message to the user to confirm whether to request the server to process the data. If it is confirmed in step S529 that no request is issued to the cloud server 230, the process ends. On the other hand, a request is issued to the cloud server 230, the process advances to step S531 to perform login processing is performed, thereby sending a request. After sending the request, the process advances to step S533. If the cloud server 230 sends a data format notification, the process advances to step S517. On the other hand, if the cloud server 230 sends no data format notification, the operation of confirming the presence/absence of a notification is repeated in step S533.

On the other hand, if there is no data processing application, in step S535 the smartphone 210 displays a confirmation message to the user to confirm whether to request the cloud server 230 to perform data processing. In step S537, if the user does not request the cloud server 230 to perform data processing, the process ends. On the other hand, if the user requests the cloud server 230 to perform data processing, the process advances to step S539 to perform login processing. The transmitter 317 transmits a data processing request to the cloud server 230. At the same time, the cloud server 230 is notified of a data format processable (reproducible and displayable) by the smartphone 210.

After requesting the cloud server 230 to perform data processing, the process advances to step S519 to display a processing menu. When the cloud server 230 instructs mail sending or uploading to a web site through the processing menu, the smartphone 210 sends such request to the cloud server 230. On the other hand, if the user sends an instruction indicating that he/she wants to reproduce data using the local device, content data converted to be displayable on the smartphone 210 is acquired from the cloud server 230 in step S523. In this case, in step S525, the reproduced image of the DVD is displayed on the display unit 321 of the smartphone 210.

(Processing Sequence of Cloud Server 230)

Figure 5B:
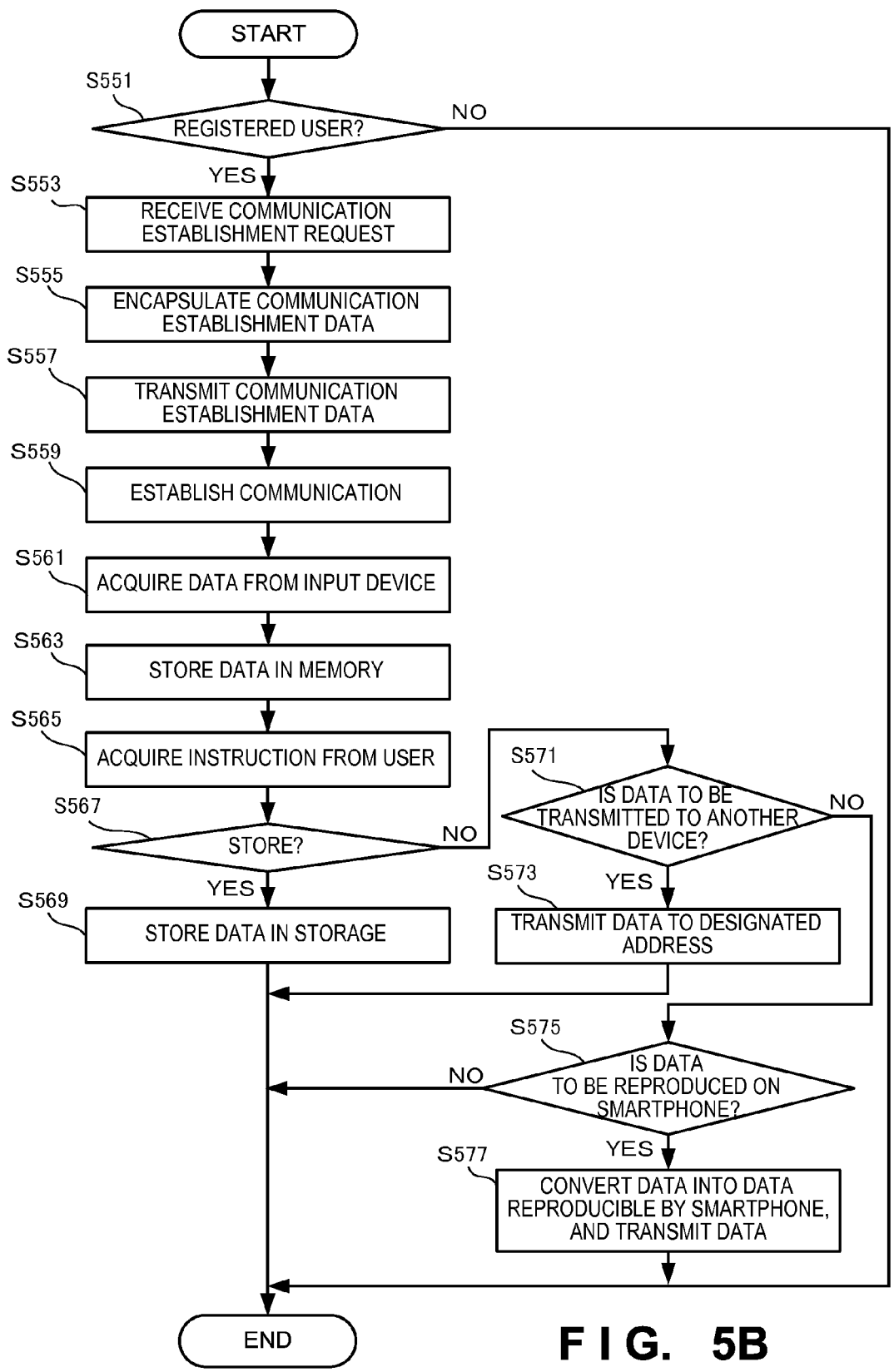
FIG. 5B is a flowchart showing the sequence of a procedure by the cloud server according to the second embodiment of the present invention.

The processing sequence of the cloud server 230 in the information processing system 200 will be described with reference to FIG. 5B. Upon detecting a login operation of the smartphone 210, the virtual PC 330a of the cloud server 230 confirms in step S551 whether the login user is a registered user. If the login user is not a registered user, the process ends. If the login user is a registered user, the virtual PC 330a subsequently receives a communication establishment request from the smartphone 210 in step S553. In step S555, the virtual PC 330a encapsulates, by an IP protocol, communication establishment data (USB packet) generated by a USB protocol.

In step S557, the virtual PC 330a transmits the encapsulated communication establishment data to the DVD player 240. In step S559, the virtual PC 330a establishes communication with the DVD player 240. In step S561, the virtual PC 330a acquires the data from the DVD player 240. In step S563, the virtual PC 330a stores the acquired data in a memory (not shown). In step S565, the data receiver 331 acquires an instruction from the user. In step S567, the virtual PC 330a confirms whether the instruction is a request for requesting to store the data. If it is necessary to store the data, the process advances to step S569 to store the data in a storage (not shown) prepared in the cloud server 230.

On the other hand, if it is unnecessary to store the data, the process advances to step S571, and the data transmitter 334 confirms whether it is necessary to transmit the data to another device. If it is necessary to transmit the data, the process advances to step S573 to transmit the data to a designated address. If it is unnecessary to transmit the data to another device, the process advances to step S575 to confirm whether to reproduce and display the data on the smartphone 210. If it is unnecessary to transmit the data to the smartphone 210, the process ends. If it is necessary to transmit the data to the smartphone 210, the process advances to step S577, and the data converter 332 converts the data to be transmitted into a data format processable by the smartphone 210. After converting the data, the data transmitter 334 transmits the converted data.

(Display on Smartphone)

FIG. 6 is a view showing a message displayed on the smartphone 210. The display unit 321 of the smartphone 210 displays, to the user, a message 601 indicating that some device has been confirmed to be connected to the USB interface 319. Since it is impossible to confirm whether the device is an input device or output device, the message 601 indicating whether to connect to the cloud server 230 and request the cloud server 230 to control the device is also displayed. With this message 601, the smartphone 210 prompts the user to select whether or not to display the message (YES or NO).

<Method of Acquiring Device Information>

Figure 7A:
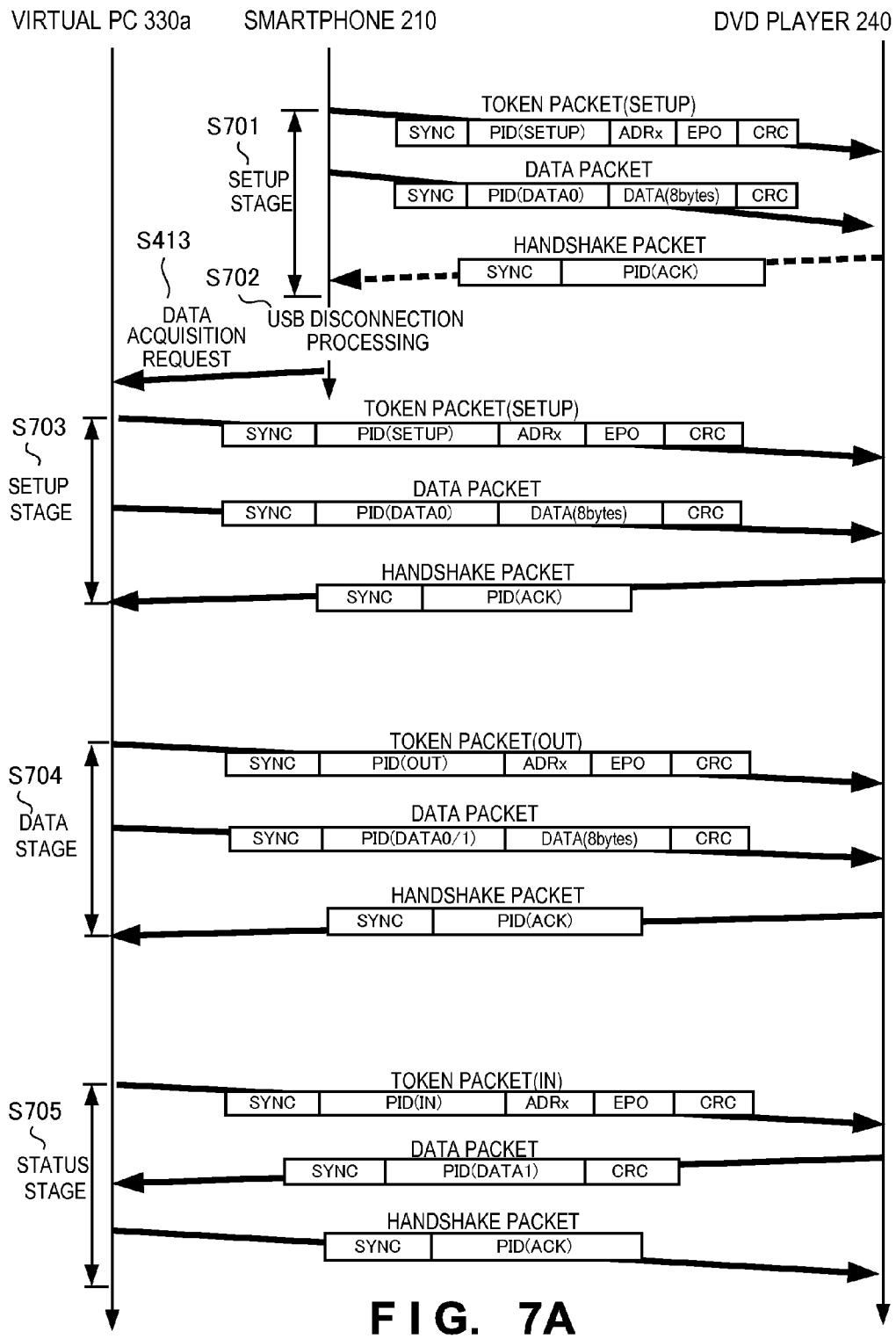
FIG. 7A is a view showing an example of packet transmission/reception processing in the information processing system according to the second embodiment of the present invention.
Figure 7B:
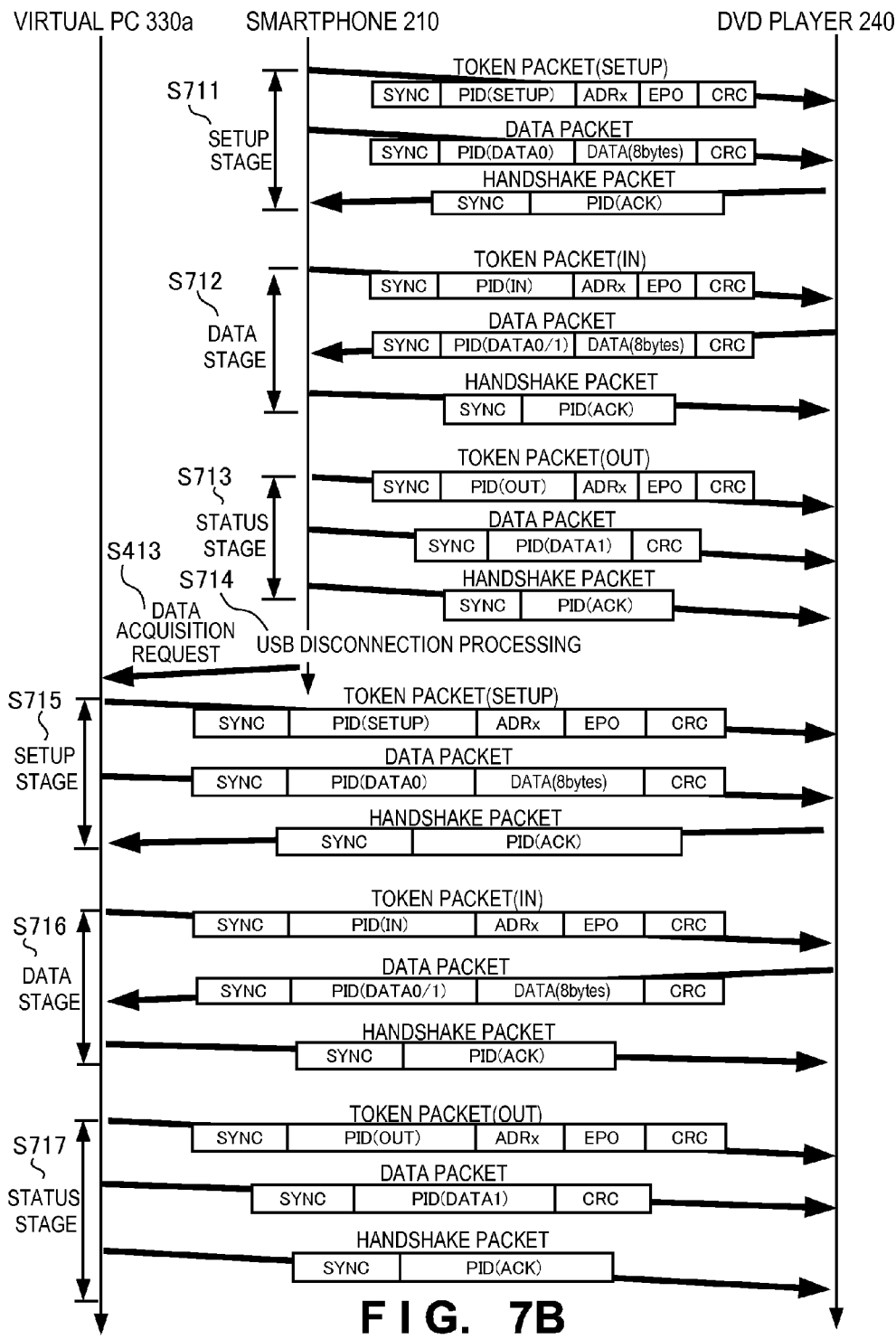
FIG. 7B is a view showing another example of packet transmission/reception processing in the information processing system according to the second embodiment of the present invention.

FIGS. 7A, 7B, and 7C are views for explaining, in more detail, exchange of the descriptors described in steps S409 and S503. FIGS. 7A, 7B, and 7C show packet data exchanged between the virtual PC 330a, the smartphone 210, and the DVD player 240.

FIG. 7A shows a sequence when no input/output device can properly be detected. When the smartphone 210 and the DVD player 240 are connected to each other, the smartphone 210 transmits a token packet and data packet to the DVD player 240 in a setup stage S701. In response to this, the DVD player 240 transmits a handshake packet to the smartphone 210. Depending on whether an appropriate handshake packet is returned, it is determined whether the local device can control the DVD player 240.

As for a device that is assumed to be connected to the smartphone 210, for example, an appropriate handshake packet is returned, and a data stage and a status stage are subsequently performed. It is possible to control the input/output device by driving a device driver prepared in the smartphone 210 according to an acquired device descriptor. However, the number of devices assumed to be connected to the smartphone 210 is very small. If no handshake packet is returned in the setup stage S701, USB disconnection processing is performed (S702), and the smartphone 210 issues a data acquisition request to the virtual PC 330a (S413).

The virtual PC 330a performs a setup stage S703 with the DVD player 240 via the smartphone 210, and advances to a data stage S704, thereby acquiring device information such as a device descriptor. The virtual PC 330a includes, in advance, a number of drivers and a number of data conversion modules so as to be connectable to various input/output devices existing in the world. The setup stage S703, the data stage S704, and the status stage S705 are smoothly performed between the virtual PC 330a and the DVD player 240, thereby appropriately establishing connection with the DVD player 240.

FIG. 7B shows a sequence when the smartphone 210 has no driver corresponding to the device descriptor acquired from the DVD player 240. In this case, a setup stage S711, a data stage S712, and a status stage S713 are performed between the smartphone 210 and the DVD player 240. If it is determined that the smartphone 210 has no device driver corresponding to a device descriptor acquired in the three stages, USB disconnection processing S714 is performed, and the smartphone 210 requests the virtual PC 330a to acquire the data (step S413).

The smartphone 210 requests the virtual PC 330a to connect to the DVD player 240. After disconnecting the USB connection between the smartphone 210 and the DVD player 240, the virtual PC 330a performs a setup stage S715, a data stage S716, and status stage S717. This enables the virtual PC 330a to directly acquire a device descriptor from the DVD player 240, and drive a driver complying with the device.

As shown in FIG. 7C, a device descriptor acquired from the DVD player 240 in a setup stage S721 and a data stage S722 between the smartphone 210 and the DVD player 240 is cached in the smartphone 210 to perform USB disconnection processing (step S724). The smartphone 210 requests the virtual PC 330a to acquire the data (step S413).

After disconnecting the connection between the smartphone 210 and the DVD player 240, the virtual PC 330a takes initiative in starting connection establishment processing with the DVD player 240 (S725 to S727). In this case, in the setup stage S725, the smartphone 210 generates a handshake packet and transmits it to the virtual PC 330a without sending a token packet and data packet for setup to the DVD player 240. In the data stage S726, upon receiving a token packet and a data packet from the virtual PC 330a, the smartphone 210 reads out the device descriptor from the cache, and transmits it to the virtual PC 330a without sending the received packets to the DVD player 240. That is, since processing of acquiring the device descriptor from the DVD player 240 can be omitted, resumption after disconnection of communication with the DVD player 240 can efficiently be performed.

(Input Device Specifying Table)

Figure 7D:
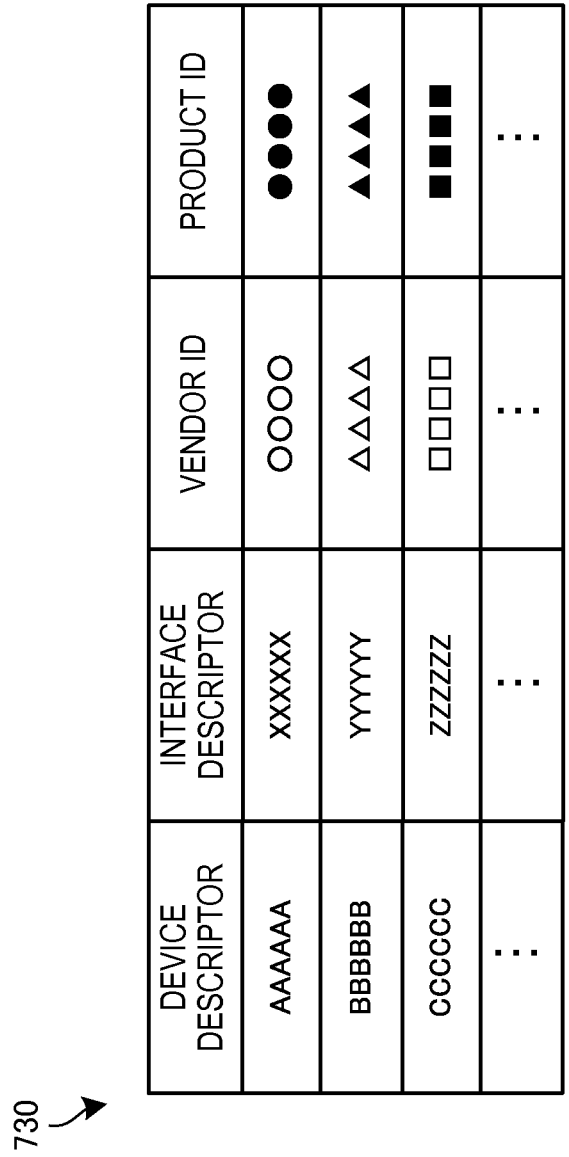
FIG. 7D is a table showing the structure of a table used in the information processing system according to the second embodiment of the present invention.

As shown in FIG. 7D, the smartphone 210 stores a table 730 representing the correspondence relationship between a device descriptor having a device driver, an interface descriptor, a vender ID, and a product ID.

When the DVD player 240 is connected, the smartphone 210 compares the device descriptor notified by the DVD player 240 with the device descriptor in the table 730. If the device descriptor notified by the DVD player 240 matches the device descriptor in the table 730, the smartphone 210 determines that the DVD player 240 is an input device processable by the local device. On the other hand, if the device descriptors do not match, the smartphone 210 determines that the DVD player 240 is an input device that cannot be processed by the local device.

Note that the vendor ID and the product ID in the device descriptor notified by the DVD player 240 may be extracted and compared with the vender ID and the product ID in the table 730. In this case, if the matching vender ID and product ID exist in the table 730, the smartphone can determine that the input device is processable by the local device. Inversely, if the vender ID and the product ID do not match the extracted IDs, the smartphone 210 can determine that the DVD player 240 cannot be processed by the local device.

(Message Table)

As shown in FIG. 7E, the cloud server 230 includes a message table 740 representing the correspondence relationship between an inquiry message and an input device. The inquiry message is a message for making various inquiries (for example, an inquiry about the output destination of data) to the user of the smartphone 210. The data transmitter 334 reads out an inquiry message corresponding to an input device connected to the smartphone 210 from the table 740, and displays the message on the display unit 321 of the smartphone 210. If, for example, the DVD player 240 is connected, an inquiry about "whether to reproduce data on the screen of the smartphone" is made to the user. If a scanner is connected, an inquiry about whether to store a read image in the virtual PC is made. If a digital camera is connected, an inquiry about whether to upload data to a blog, store data in a photo album on the Internet, or request a printing service to print photos is made. Furthermore, if a sensor is connected, candidates of the transmission destination of a sensor result are displayed to prompt the user to select the transmission destination.

In addition, as shown in FIG. 7F, processing candidates to be performed by the cloud server 230 and various input devices are saved in association with each other as a processing candidate table 750. Detailed processing contents, a data conversion method, a data size, and the like are also saved in association with each processing candidate. Processing candidates corresponding to an input device connected to the smartphone 210 are read out from the processing candidate table 750, and selectively displayed on the smartphone 210. By using the tables shown in FIGS. 7E and 7F, it is possible to confirm with the user where and how data acquired from the input device is output, as described in step S410. For example, a message "A content in DVD has been recognized. Where do you want to output the content?" is displayed on the display unit 321 of the smartphone 210. Furthermore, for example, options such as "smartphone", "external display", "mail attachment", and "uploading to video site" may be displayed.

Figure 7G:
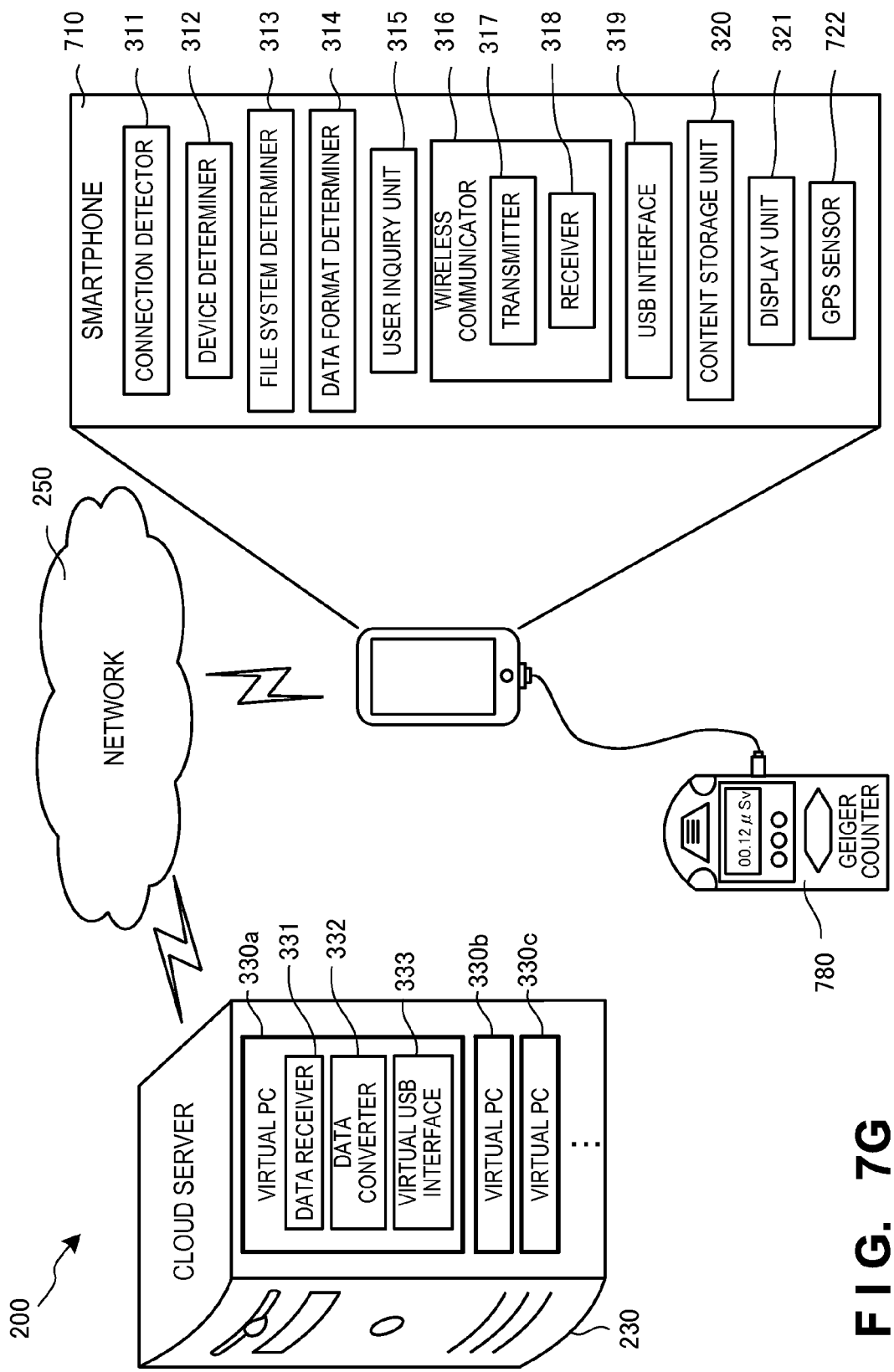
FIG. 7G is a block diagram showing a modification of the information processing system according to the second embodiment of the present invention.

For example, consider a case in which a Geiger counter 780 is connected to the smartphone 710, as shown in FIG. 7G. Upon receiving a request to upload data to a radiation dose open site from the display unit 321 of the smartphone 710, the cloud server 230 transmits, to a designated site, a radiation dose, detection place, and detection time in association with each other by using a GPS (Global Positioning System) sensor 722 of the smartphone 210 or the like. This allows the user to make a radiation dose at each position on a map open to the public.

Furthermore, as shown in FIG. 7H, if an electronic musical instrument 790 is connected to the smartphone 210, the cloud server 230 can merge performance data obtained from the electronic musical instrument 790 with performance data of another musical instrument similarly connected to another smartphone, and output the merged data.

By accumulating, as knowledge, the input devices and requests from the user in correspondence with each other, it is possible to change inquiry contents to the user, as needed, when an input device is connected, thereby presenting optimum inquiry contents to the user.

(USB Connection Processing)

Signals exchanged between the cloud server 230, the smartphone 210, and the DVD player 240 before communication is established by USB will be described in more detail with reference to FIGS. 8A to 8D. Especially a case in which the device descriptor is saved in the cache as shown in FIG. 7C will be explained here.

In step S801, the DVD player 240 is connected to the smartphone 210, and powered on. In step S802, the smartphone 210 starts USB connection processing with the DVD player 240, and transmits a reset signal. In step S803, the smartphone 210 designates an address for the DVD player 240. After that, the address is added to a packet to be exchanged between the smartphone 210 and the DVD player 240.

In step S804, the smartphone 210 performs the processing of a "GET DESCRIPTOR" command to acquire a descriptor from the DVD player 240. The processing of the "GET DESCRIPTOR" command is the same as that in steps S721 to S723 described with reference to FIG. 7C and a detailed description thereof will be omitted. When a request for the descriptor is transmitted to the DVD player 240 (S805), the DVD player 240 transmits a device descriptor stored in the endpoint 0 area to the smartphone 210 (S806 and S807). The smartphone 210 transmits an acknowledgement signal (ACK) to the DVD player 240 in the status stage S723.

Upon acquiring the device descriptor, the smartphone 210 saves the device descriptor in the cache (S724). Using the device descriptor, it is determined whether the smartphone 210 can control the device (S409). If it is determined that the smartphone 210 cannot control the device, the process advances to step S811 to perform USB disconnection processing. At the same time, the smartphone 210 requests the cloud server 230 to control the DVD player 240 (S812).

In step S813, the cloud server 230 starts processing to control the DVD player 240, and transmits a reset signal to the DVD player 240 via the smartphone 210. In step S815, the cloud server 230 performs a "SET ADDRESS" command, thereby designating an address for the DVD player 240.

The cloud server 230 performs a "GET DESCRIPTOR" command (S816) and a "GET CONFIGURATION" command (S824) for the DVD player 240 via the smartphone 210 (S823). More specifically, in step S817, the cloud server 230 sends a "GET DESCRIPTOR" command to the smartphone 210. In step S819, the smartphone 210 reads out the device descriptor saved in the cache, and transmits it to the cloud server 230.

In step S825, the DVD player 240 transmits a configuration descriptor stored in the endpoint 0 area. When the cloud server 230 performs bulk transfer for the DVD player 240 via the smartphone 210 (S826), the DVD player 240 reads out the content data saved in the DVD (S827), and transmits it to the cloud server 230.

In step S409, it is determined based on the device descriptor of the DVD player 240 that the DVD player 240 is not a controllable device, the process advances to step S828 of FIG. 8B. In steps S828 and S829, configuration descriptor acquisition processing is performed. In response to this, the DVD player 240 transmits a configuration descriptor to the smartphone 210. In steep 5832, the smartphone 210 saves the acquired configuration descriptor in the cache. In step S409, based on the configuration descriptor, the smartphone 210 determines whether the DVD player 240 is a device controllable by the smartphone 210. If the smartphone 210 determines that the DVD player 240 is uncontrollable, the process advances to step S833 to disconnect the USB connection between the smartphone 210 and the DVD player 240.

After disconnecting the USB connection, the smartphone 210 requests the cloud server 230 to control the DVD player 240. In response to the control request, the cloud server 230 starts USB control while transmitting a reset signal to the DVD player 240 via the smartphone 210 (S835), and subsequently performs a "SET ADDRESS" command (S836), thereby designating an address for the DVD player 240. Furthermore, when the cloud server 230 requests a descriptor of the smartphone 210 by a "GET DESCRIPTOR" command (S837), the smartphone 210 reads out the device descriptor from the cache (S839), and returns it to the cloud server 230 (S840), instead of relaying the request to the DVD player 240.

In addition, when the cloud server 230 executes a "GET CONFIGURATION" command for the DVD player 240 via the smartphone 210 (S841), the smartphone 210 reads out the configuration descriptor stored in the cache, and transmits it to the cloud server 230 (S843), instead of transmitting the command to the DVD player 240. When the cloud server 230 performs bulk transfer for the DVD player 240 via the smartphone 210 (S844), the DVD player 240 reads out the content data saved in the DVD (S845), and transmits it to the cloud server 230 via the smartphone 210.

If it is determined based on the configuration descriptor in step S409 that the device is controllable (B), the process advances to bulk transfer processing in step S846 of FIG. 8C. In the bulk transfer processing as well, by performing a setup stage, data stage, and status stage, the DVD player 240 reads out the content data from the DVD 341, and transmits it to the smartphone 210 (S849).

Upon receiving the readout content data, the smartphone 210 saves it in the cache (S851), and determines whether it includes an application that can perform reproduction processing for the content data (S852).

If it is determined that the content data can be processed, the process advances to step S853 to continue the processing without accessing the cloud server 230. That is, in this case, the smartphone 210 can reproduce the content data in the DVD player 240 without any change.

On the other hand, if the smartphone 210 includes no application that can process the content data in the DVD player 240, the process advances to step S854 to perform processing of disconnecting the USB connection. The process then advances to step S856 of FIG. 8D.

Figure 8A:
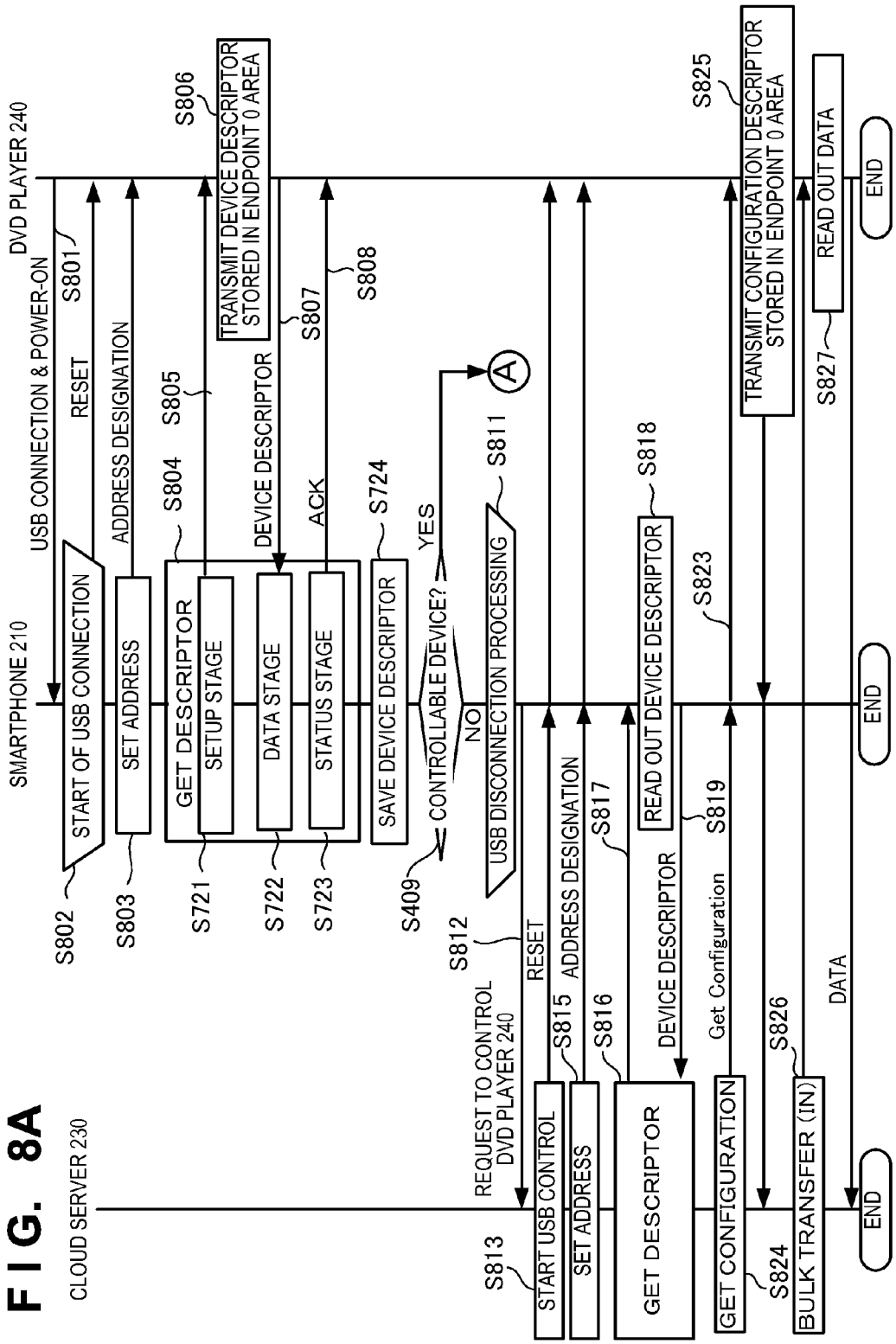
FIG. 8A is a sequence chart showing an example of communication establishment processing between a server and a device in the information processing system according to the second embodiment of the present invention.
Figure 8D:
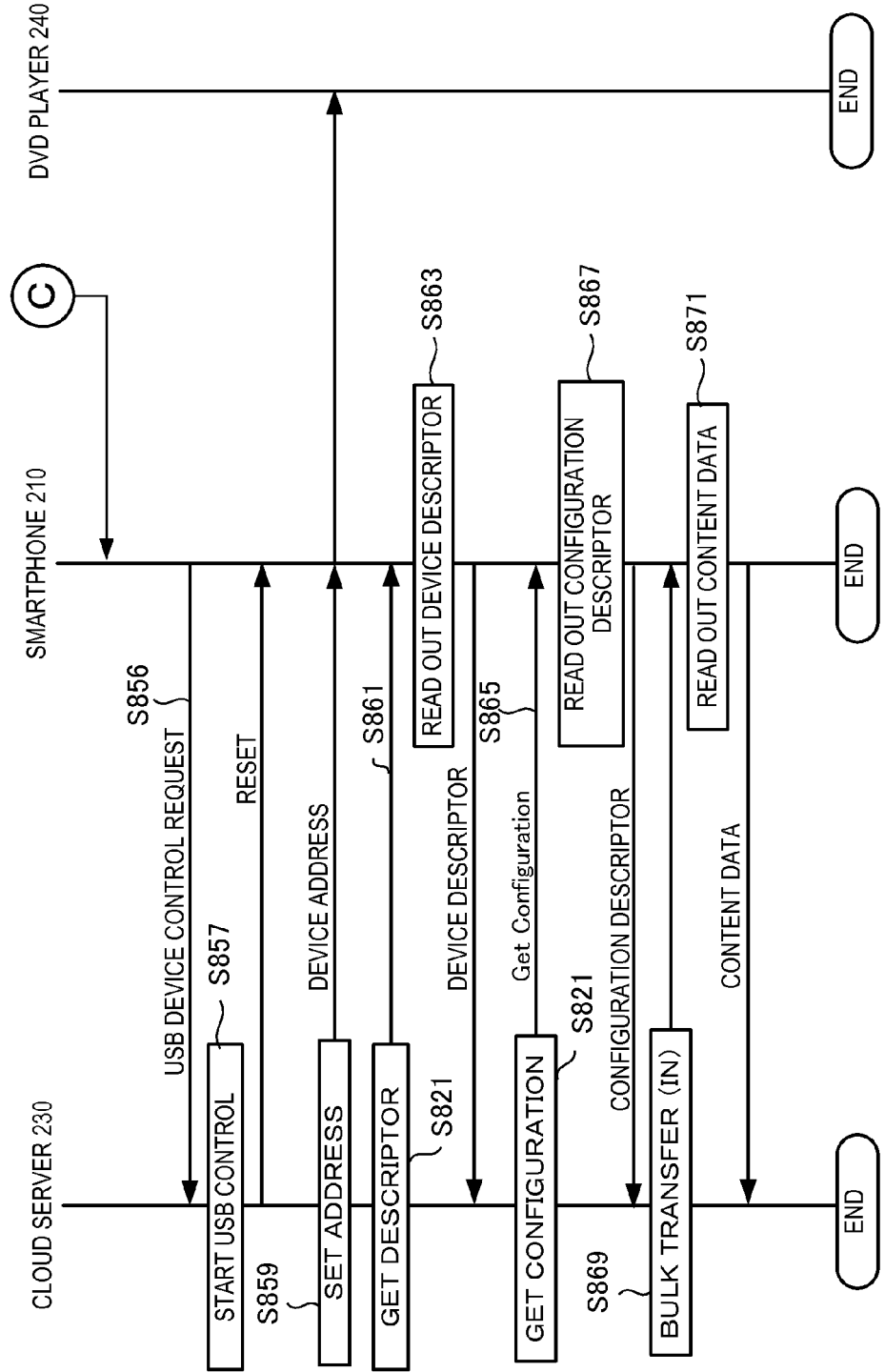
FIG. 8D is a sequence chart showing the example of the communication establishment processing between the server and the device in the information processing system according to the second embodiment of the present invention.

In step S856 of FIG. 8D, the smartphone 210 requests the cloud server 230 to perform USB device control. The smartphone 210 requests the cloud server 230 to control the DVD player 240. In response to the control request, the cloud server 230 starts USB control while transmitting a reset signal to the DVD player 240 via the smartphone 210 (S857). The cloud server 230 subsequently performs a "SET ADDRESS" command (S859), thereby designating an address for the DVD player 240. Furthermore, the cloud server 230 requests a descriptor of the smartphone 210 by a "GET DESCRIPTOR" command (S861). In response to this, the smartphone 210 reads out the device descriptor from the cache (S863), and returns it to the cloud server 230, instead of relaying the request to the DVD player 240.

When the cloud server 230 executes a "GET CONFIGURATION" command for the DVD player 240 via the smartphone 210 (S865), the smartphone 210 reads out the configuration descriptor saved in the cache, and transmits it to the cloud server 230 via the smartphone 210 (S867), instead of relaying the command.

When the cloud server 230 performs bulk transfer for the DVD player 240 via the smartphone 210 (S869), the smartphone 210 reads out input data saved in the cache (S871), and transmits it to the cloud server 230.

The above-described sequence makes it possible to efficiently perform communication between the cloud server 230 and the DVD player 240 by taking advantage of the cache of the smartphone 210.

(Hardware Arrangement of Smartphone)

Figure 9:
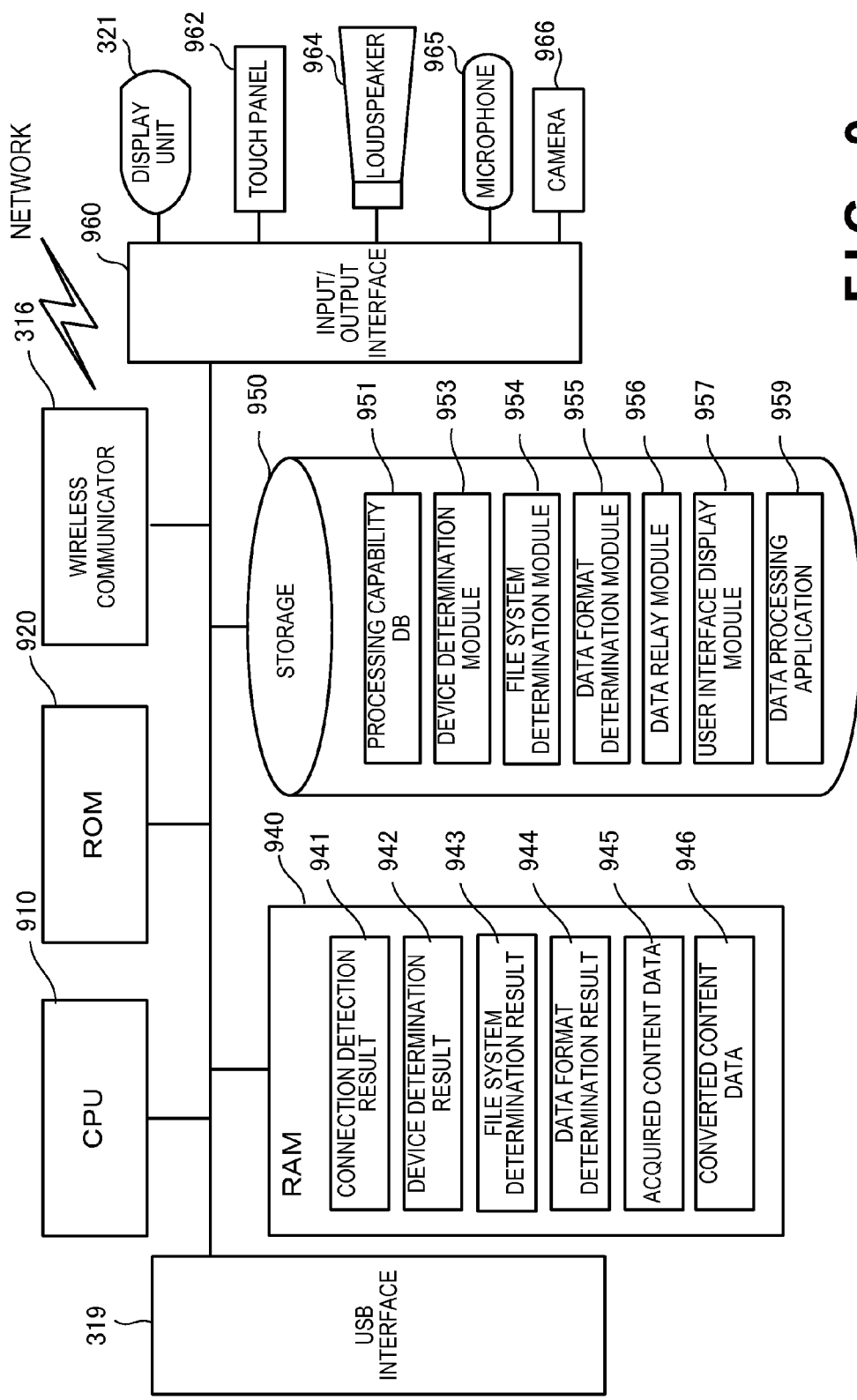
FIG. 9 is a view showing the hardware arrangement of the server according to the second embodiment of the present invention.

The internal arrangement of the smartphone 210 will be described with reference to FIG. 9. The smartphone 210 includes a CPU (Central Processing Unit) 910, a ROM (Read Only Memory) 920, the wireless communicator 316, a RAM (Random Access Memory) 940, a storage 950, and an input/output interface 960.

The CPU 910 is a central processing unit, and controls the overall smartphone 210 by executing various programs. The ROM 920 is a read only memory, and stores various parameters and the like as well as a boot program to be executed first by the CPU 910. The RAM 940 stores a connection detection result 941, a device determination result 942, a file system determination result 943, a data format determination result 944, acquired content data 945, and converted content data 946.

The wireless communicator 316 controls communication with the cloud server 230 via a network.

The RAM 940 temporarily stores the connection detection result 941, the device determination result 942, the file system determination result 943, and the data format determination result 944. The connection detection result 941 is the result of detecting a connected device that has been detected by the connection detector 311. The device determination result 942 is the result of determining the type of the detected connected device. The file system determination result 943 is the result of determining whether the local device can acquire the file system of the data stored in the DVD player 240 and acquired by the local device. The data format determination result 944 is the result of determining whether the local device can process the data format of the data stored in the DVD player 240.

The RAM 940 temporarily stores the acquired content data 945 and the converted content data 946. The acquired content data 945 is content data acquired from an input device such as the DVD player 240, and is to be transmitted to the cloud server 230. The converted content data 946 is content data converted by the cloud server 230, and is to be reproduced by the smartphone 210.

On the other hand, the storage 950 stores a processing capability database 951 indicating the processing capability of the smartphone. By referring to the database, the smartphone 210 can determine whether the local device can process the content data. Furthermore, the storage 950 stores a device determination module 953, a file system determination module 954, a data format determination module 955, a data relay module 956, a user interface display module 957, and a data processing application 959.

The device determination module 953 is executed by the CPU 910 so as to function as the device determiner 312. The file system determination module 954 is executed by the CPU 910 so as to function as the file system determiner 313. The data format determination module 955 is executed by the CPU 910 so as to function as the data format determiner 314. Furthermore, the data relay module 956 is executed by the CPU 910 so as to function with the wireless communicator 316, thereby relaying an exchange of data between the cloud server 230 and the input device. More specifically, the data relay module 956 performs USB over IP encapsulating and decapsulating. The user interface display module 957 is executed by the CPU 910 so as to display the dialog shown in FIG. 6 on the display unit 321 of the smartphone 210.

The input/output interface 960 relays input/output data to/from an input/output device. The input/output interface 960 is connected to the display unit 321, a touch panel 962, a loudspeaker 964, a microphone 965, and a camera 966, that are incorporated in the smartphone 210. Furthermore, the smartphone 210 includes the USB interface 319 capable of connecting an external device.

In the information processing system according to this embodiment, the above-described arrangement and operation make it possible to control an input device which is connected to the smartphone and in which no driver is preinstalled.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention may be applied to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program.

This application claims the benefit of Japanese Patent Application No. 2012-068515 filed on Mar. 24, 2012, which is hereby incorporated by reference herein in its entirety.

The invention claimed is:

1. An information processing system comprising:
a mobile device; and
a server connected to the mobile device via a wireless communication network,
wherein the mobile device comprises a first memory storing first instructions and a first processor configured to execute the first instructions to:
  determine, when an input device is connected via a communication interface, whether the mobile device can control the input device;
  request, when it is determined that the mobile device cannot control the input device, the server to control the input device; and
  control signal transfer between the input device and the server via the communication interface and the wireless communication network, so that the server can control the input device, by establishing communication between the input device and the server; and
wherein the server comprises a second memory storing second instructions and a second processor configured to execute the second instructions to:
control, in response to the request, the input device via the established communication with the input device;
read, from a message table storing a correspondence relationship between a type of the input device and an inquiry message to inquire about an output destination of a data input from the input device, the inquiry message corresponding to the input device connected to the mobile device; and
display the inquiry message on a display device of the mobile device.

2. The information processing system according to claim 1, wherein the first processor is further configured to execute the first instructions to:
  determine whether the mobile device can process data provided by the input device;
  request, when it is determined that the mobile device cannot process the data provided by the input device, the server to process the data provided by the input device; and
  control data transfer from the input device to the server via the communication interface and the wireless communication network, so that the server can process the data provided by the input device; and
wherein the server acquires the data provided by the input device via the communication established between the input device and the server and processes the data.

3. The information processing system according to claim 1, wherein the second processor is further configured to execute the second instructions to:
  acquire the data provided by the input device;
  convert the acquired data into data processable by the mobile device; and
  transmit the converted data to the mobile device via the wireless communication network; and
wherein the first processor is further configured to execute the first instructions to receive the converted data.

4. An information processing system comprising:
a mobile device; and
a server connected to the mobile device via a wireless communication network,
wherein the mobile device comprises a first memory storing first instructions and a first processor configured to execute the first instructions to:
  determine, when an input device is connected via a communication interface, whether the mobile device can control the input device;
  request, when it is determined that the mobile device cannot control the input device, the server to control the input device; and
  control signal transfer between the input device and the server via the communication interface and the wireless communication network, so that the server can control the input device, by establishing communication between the input device and the server; and
wherein the server comprises a second memory storing second instructions and a second processor configured to execute the second instructions to:
  control, in response to the request, the input device via the established communication with the input device;
  store, in a processing candidate table, a correspondence relationship between a type of the input device and a candidate for processing the data;
  read, from the processing candidate table, the candidate for processing corresponding to the input device connected to the mobile device; and
  cause selective display of the candidate on a display device of the mobile device.

5. The information processing system according to claim 4, wherein the first processor is further configured to execute the first instructions to:

determine whether the mobile device can process data provided by the input device;

request, when it is determined that the mobile device cannot process the data provided by the input device, the server to process the data provided by the input device; and control data transfer from the input device to the server via the communication interface and the wireless communication network, so that the server can process the data provided by the input device; and wherein the server acquires the data provided by the input device via the communication established between the input device and the server and processes the data.

6. The information processing system according to claim 4, wherein the second processor is further configured to execute the second instructions to:

acquire the data provided by the input device;

convert the acquired data into data processable by the mobile device; and transmit the converted data to the mobile device via the wireless communication network; and wherein the first processor is further configured to execute the first instructions to receive the converted data.

7. An information processing method comprising:

determining, when an input device is connected via a communication interface, whether a mobile device can control the input device;

requesting, when it is determined that the mobile device cannot control the input device, a server connected via a wireless communication network to control the input device;

controlling the input device via established communication with the input device in response to the requesting;

controlling signal transfer between the input device and the server via the communication interface and the wireless communication network, so that the server can control the input device, by establishing communication between the input device and the server;

reading, from a message table storing a correspondence relationship between a type of the input device and an inquiry message to inquire about an output destination of a data input from the input device, the inquiry message corresponding to the input device connected to the mobile device; and displaying the inquiry message on a display device of the mobile device.

8. The information processing method according to claim 7, further comprising:

determining whether the mobile device can process data provided by the input device;

requesting, when it is determined that the mobile device cannot process the data provided by the input device, the server to process the data provided by the input device;

controlling data transfer from the input device to the server via the communication interface and the wireless communication network, so that the server can process the data provided by the input device;

acquiring, by the server, the data provided by the input device via the communication established between the input device and the server; and processing the data.

9. The information processing method according to claim 7, further comprising:

acquiring the data provided by the input device;

converting the acquired data into data processable by the mobile device;

transmitting the converted data to the mobile device via the wireless communication network; and receiving the converted data.

10. A non-transitory computer-readable storage medium storing a control program of a mobile device, the control program, when executed by a computer, causing the computer to execute a method, the method comprising:

determining, when an input device is connected via a communication interface, whether a mobile device can control the input device by recognizing the input device;

requesting, when it is determined that the mobile device cannot control the input device, a server connected via a wireless communication network to control the input device;

controlling signal transfer between the input device and the server via the communication interface and the wireless communication network, so that the server can control the input device, by establishing communication between the input device and the server;

reading, from a message table storing a correspondence relationship between a type of the input device and an inquiry message to inquire about an output destination of a data input from the input device, the inquiry message corresponding to the input device connected to the mobile device; and displaying the inquiry message on a display device of the mobile device.

11. The non-transitory computer-readable storage medium according to claim 10, further comprising:

determining whether the mobile device can process data provided by the input device;

requesting, when it is determined that the mobile device cannot process the data provided by the input device, the server to process the data provided by the input device;

controlling data transfer from the input device to the server via the communication interface and the wireless communication network, so that the server can process the data provided by the input device;

acquiring, by the server, the data provided by the input device via the communication established between the input device and the server; and processing the data.

12. The non-transitory computer-readable storage medium according to claim 10, further comprising:

acquiring the data provided by the input device;

converting the acquired data into data processable by the mobile device;

transmitting the converted data to the mobile device via the wireless communication network; and receiving the converted data.

13. An information processing system comprising:

a mobile device; and a server connected to the mobile device via a wireless communication network, wherein the mobile device comprises a first memory storing first instructions and a first processor configured to execute the first instructions to:

determine, when an input device is connected via a communication interface, whether the mobile device can control the input device;

request, when it is determined that the mobile device cannot control the input device, the server to control the input device; and control signal transfer between the input device and the server via the communication interface and the wireless communication network, so that the server can control the input device, by establishing communication between the input device and the server; and wherein the server comprises a second memory storing second instructions and a second processor configured to execute the second instructions to:
control, in response to the request, the input device via the established communication with the input device;
control a second input device via established communication with the input device in response to a request;
store, in a processing candidate table, a correspondence relationship between a type of the input device and a candidate for processing;
read, from the processing candidate table, the candidate for processing corresponding to the input device connected to the mobile device; and
cause selective display of the candidate on a display device of the mobile device.

14. The information processing system according to claim 13, wherein:
the second processor is further configured to execute the second instructions to: control transfer of the data to the server when an amount of the data acquired from the input device reaches a threshold amount, and
accept the transferred data to start control of the input device.

15. An information processing method of a server connected to a wireless communication network, the method comprising:
receiving, via the wireless communication network when a mobile device determines that the mobile device cannot control an input device connected to the mobile device via a communication interface, a request to control the input device;
establishing, in response to the request, communication with the input device via the wireless communication network;
controlling the input device, via the communication interface of the mobile device over the wireless communication network;
reading, from a message table storing a correspondence relationship between a type of the input device and an inquiry message to inquire about an output destination of a data input from the input device, the inquiry message corresponding to the input device connected to the mobile device; and
displaying the inquiry message on a display device of the mobile device.

16. The information processing method of claim 15, wherein the method further includes:
receiving, from the mobile device over the wireless communication network, input data;
converting, in response to the request, the input data from a first format into a second format the input device is configured to process; and
wherein controlling the input device includes providing, via the communication interface of the mobile device over the wireless network, the converted input data to the input device.

17. A non-transitory computer-readable storage medium storing a program that, when executed by a server connected to a wireless communication network, causes the server to perform an information processing method, the method comprising:
receiving, via the wireless communication network when a mobile device determines that a mobile device cannot control an input device connected to the mobile device via a communication interface, a request to control the input device;
establishing, in response to the request, communication with the input device via the wireless communication network;
controlling the input device, via the communication interface of the mobile device over the wireless communication network;
reading, from a message table storing a correspondence relationship between a type of the input device and an inquiry message to inquire about an output destination of a data input from the input device, the inquiry message corresponding to the input device connected to the mobile device; and
displaying the inquiry message on a display device of the mobile device.

18. The non-transitory computer-readable storage medium of claim 17, wherein the method further includes:
receiving, from the mobile device over the wireless communication network, input data; and
converting, in response to the request, the input data from a first format into a second format that the input device is configured to process; and
wherein controlling the input device includes providing, via the communication interface of the mobile device over the wireless network, the converted input data to the input device.

19. A server connected to a wireless communication network, the server comprising:
a memory storing instructions; and
a processor configured to execute the instruction to:
receive, via the wireless communication network when a mobile device determines that a mobile device cannot control an input device connected to the mobile device via a communication interface, a request to control the input device;
establish, in response to the request, communication with the input device via the wireless communication network;
control the input device, via the communication interface of the mobile device over the wireless communication network;
read, from a message table storing a correspondence relationship between a type of the input device and an inquiry message to inquire about an output destination of a data input from the input device, the inquiry message corresponding to the input device connected to the mobile device; and
display the inquiry message on a display device of the mobile device.

20. The server of claim 19, wherein the processor is further configured to execute the instructions to:
receive, from the mobile device over the wireless communication network, input data; and
convert, in response to the request, the input data from a first format into a second format the input device is configured to process; and
wherein, to control the input device, the server is configured to execute the instructions to provide, via the communication interface of the mobile device over the wireless network, the converted input data to the input device.

* * * * *